Figure 1:
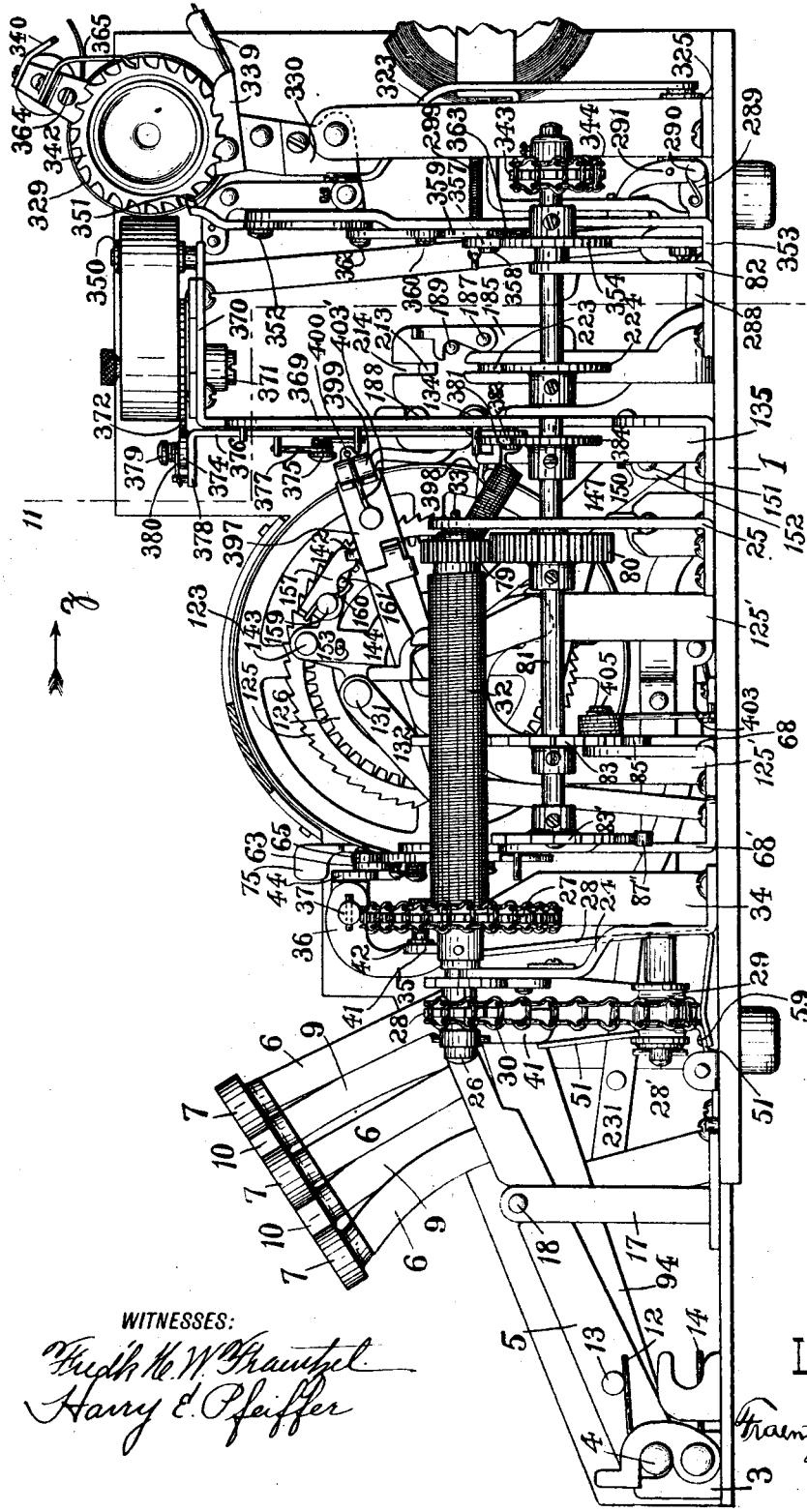

L. I. DARBY.
ADDING MACHINE.
APPLICATION FILED FEB. 21, 1912.

1,068,384.

Patented July 22, 1913.
17 SHEETS—SHEET 6.

Fig. 6.

WITNESSES:

INVENTOR:
Levi I. Darby
BY Fraentzel and Richards
ATTORNEYS

L. I. DARBY.
ADDING MACHINE.
APPLICATION FILED FEB. 21, 1912.

1,068,384.

Patented July 22, 1913.
17 SHEETS—SHEET 8.

WITNESSES:
Fredk. H. W. Fraentzel
Harry E. Pfeiffer

INVENTOR:
Levi I. Darby,
BY Fraentzel and Richards,
ATTORNEYS

L. I. DARBY.
ADDING MACHINE.
APPLICATION FILED FEB. 21, 1912.

1,068,384.

Patented July 22, 1913.

17 SHEETS—SHEET 9.

WITNESSES:
Fredk. H. W. Fraentzel
Harry E. Pfeiffer

INVENTOR:
Levi I. Darby
BY
Fraentzel and Richards,
ATTORNEYS

L. I. DARBY.
ADDING MACHINE.
APPLICATION FILED FEB. 21, 1912.

1,068,384.

Patented July 22, 1913.
17 SHEETS—SHEET 10.

WITNESSES:

INVENTOR:
Levi I. Darby,
BY
Fraentzel and Richards,
ATTORNEYS

L. I. DARBY.
ADDING MACHINE.
APPLICATION FILED FEB. 21, 1912.

1,068,384.

Patented July 22, 1913.

17 SHEETS—SHEET 11.

WITNESSES:
Fred'k W. Fraentzel
Harry E. Pfeiffer

INVENTOR:
Levi I. Darby,
BY Fraentzel and Richards,
ATTORNEYS

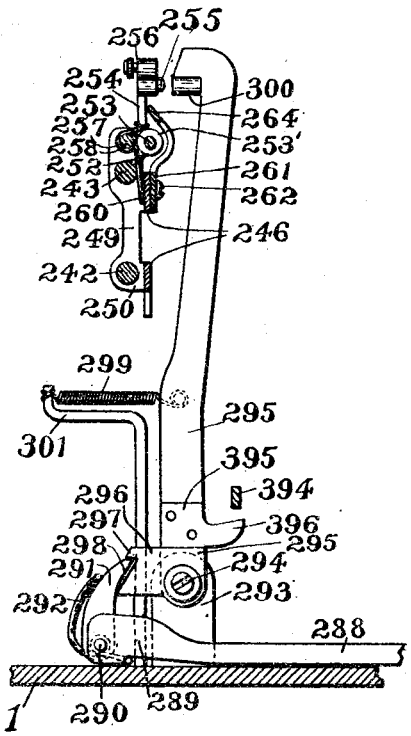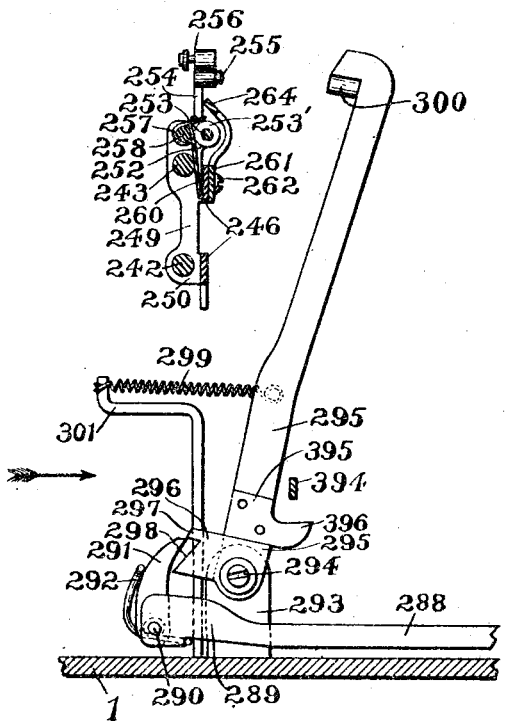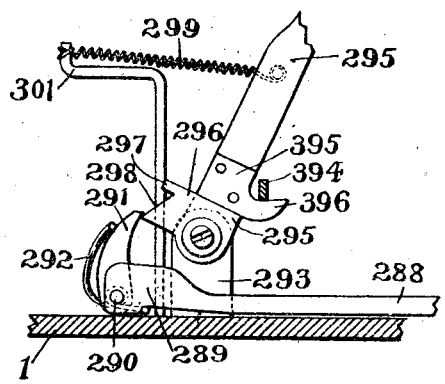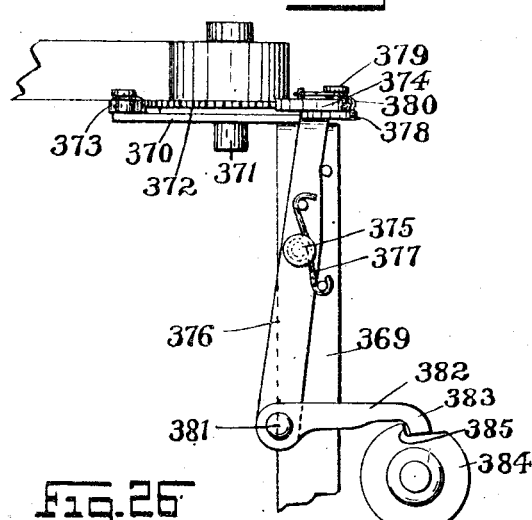

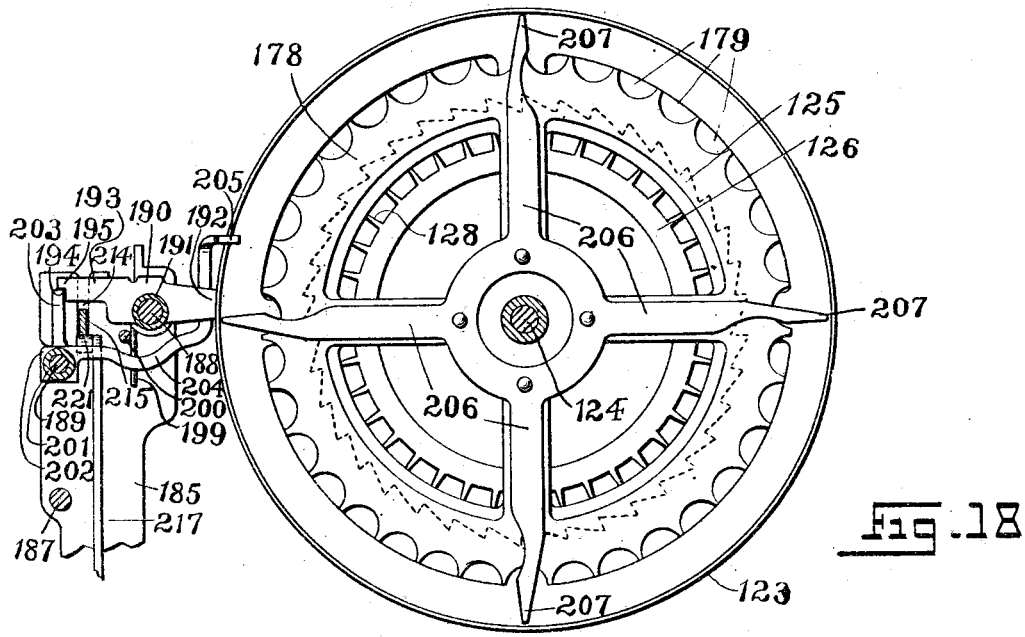
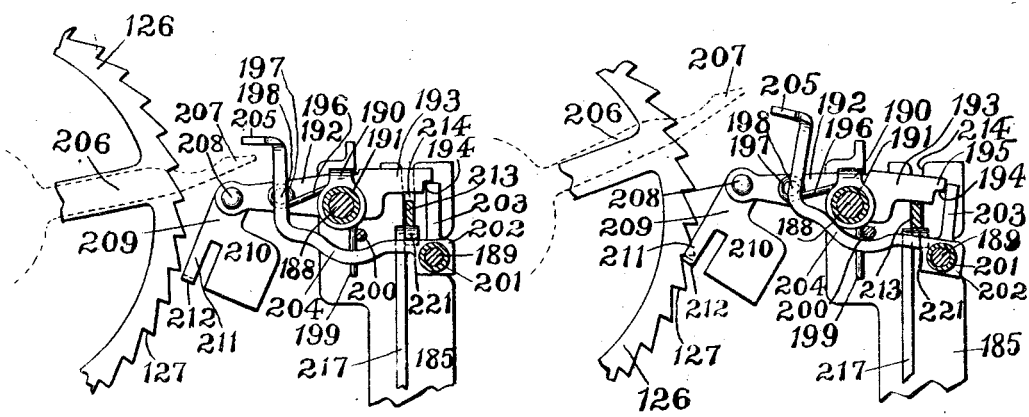

L. I. DARBY.
ADDING MACHINE.
APPLICATION FILED FEB. 21, 1912.

1,068,384.

Patented July 22, 1913.
17 SHEETS—SHEET 17.

WITNESSES:
Fredk. H. W. Fraentzel
Harry E. Pfeiffer

INVENTOR:
Levi I. Darby,
BY
Fraentzel and Richards,
ATTORNEYS

UNITED STATES PATENT OFFICE.

LEVI I. DARBY, OF NEWARK, NEW JERSEY, ASSIGNOR TO DARBY MACHINE COMPANY, A CORPORATION OF NEW JERSEY.

ADDING-MACHINE.

1,068,384.  Specification of Letters Patent.  Patented July 22, 1913.

Application filed February 21, 1912. Serial No. 679,103.

*To all whom it may concern:*

Be it known that I, LEVI I. DARBY, a citizen of the United States, residing at Newark, in the county of Essex and State of New Jersey, have invented certain new and useful Improvements in Adding-Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in adding and printing machines; and, the invention relates, more particularly, to a novel machine for registering, recording and printing figures, the aggregate sum of addition of the figures printed being likewise recorded upon a series of registering or adding disks, so that such sum of addition can be readily printed at the end of the column of printed figures which are to be added.

The present invention has for its principal object to provide a combined adding and printing machine of the general character above stated, the mechanism of which is simple and operates most efficiently; and, furthermore, the purpose of this invention is to provide an adding machine provided with two sets of depressible keys, one set of keys being employed for laterally moving a releasing or setting carriage the required distance according to the number of digits in the figure to be printed; and, the other set of keys being used for actuating the recording or indicating disk-operating mechanism, and simultaneously locking all of the recording or indicating disks against movement, as long as a key is depressed, said second set of keys being employed also for actuating means for producing a lateral and intermittent movement of a printing device or carriage, and the operation of a triphammer for striking the spring-controlled printing-characters mounted upon said carriage for printing the desired figures upon a strip of paper.

The invention has for its further object to provide a simple and efficiently operating means for regulating and limiting the degrees of depression of the different keys in said first-mentioned set of keys, whereby the movement laterally of the releasing or setting-carriage is also correspondingly limited and is arrested at the proper place so that the recording or indicating disk to the left of the machine and corresponding to the number upon the depressed key of said first-mentioned set of keys will first be operated by the depression of any one of the keys in said second-mentioned set of keys, and by the successive depressions of the keys in said second-mentioned set of keys the said releasing or setting carriage moving laterally and intermittently from left to right, so as to cause said carriage to stop in front of each recording and indicating disk, which disks are successively operated in sequence from left to right, until the releasing or setting-carriage has moved in front of the first disk at the extreme right of the machine, when all of the actuated parts have returned to their normal initial positions.

Other objects of this invention not at this time more particularly enumerated will be clearly understood from the following detailed description of the present invention.

With the various objects of the present invention in view, the said invention consists, primarily, in the novel adding and printing machine hereinafter set forth; and, the invention consists, furthermore, in the several novel organizations and combinations of the various devices and their parts, as well as in the details of the construction of the said parts, all of which will be more fully described in the following specification, and then finally embodied in the clauses of the claims which are appended to and which form an essential part of this specification.

The invention is clearly illustrated in the accompanying drawings, in which:—

Figure 2:
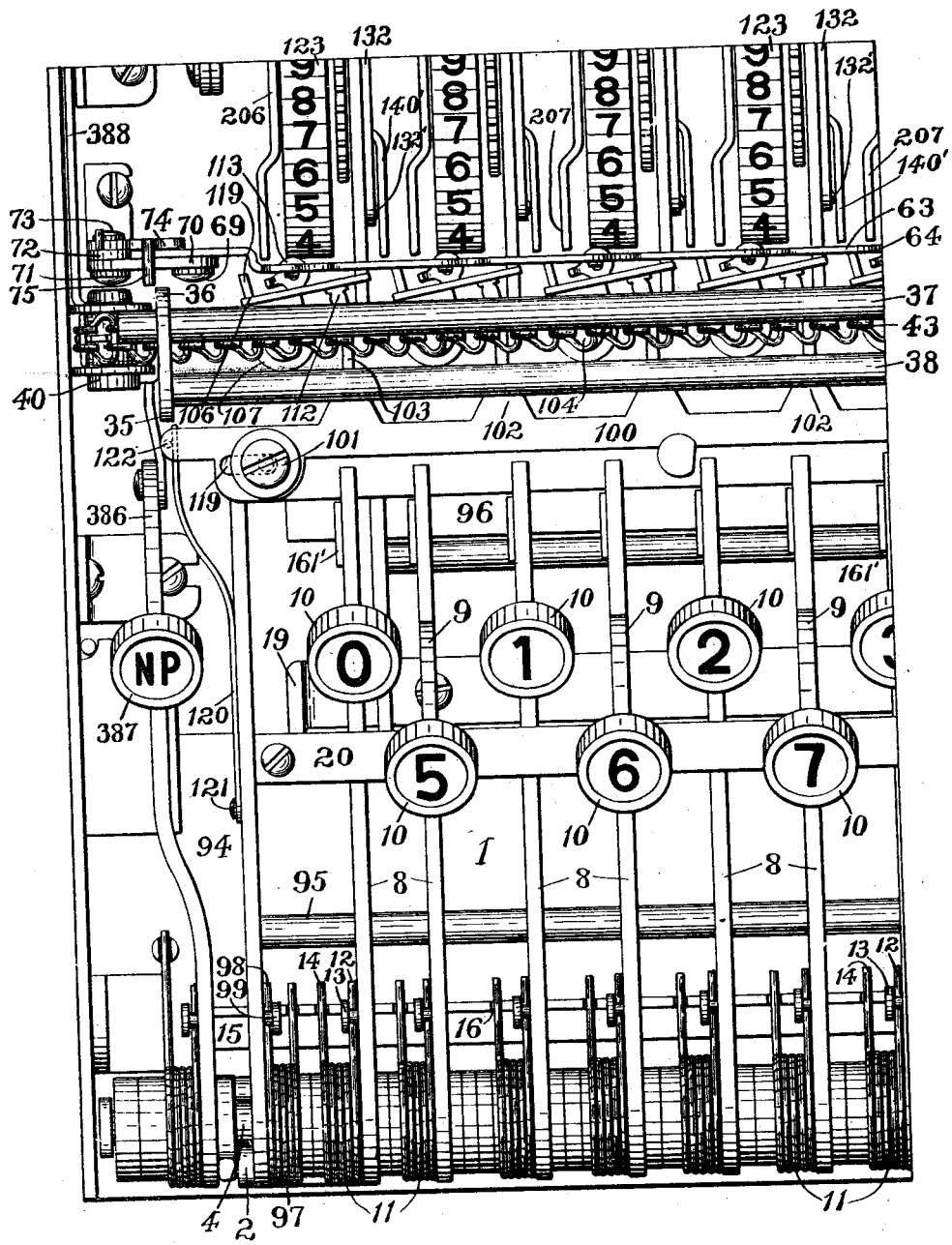
Figure 7:
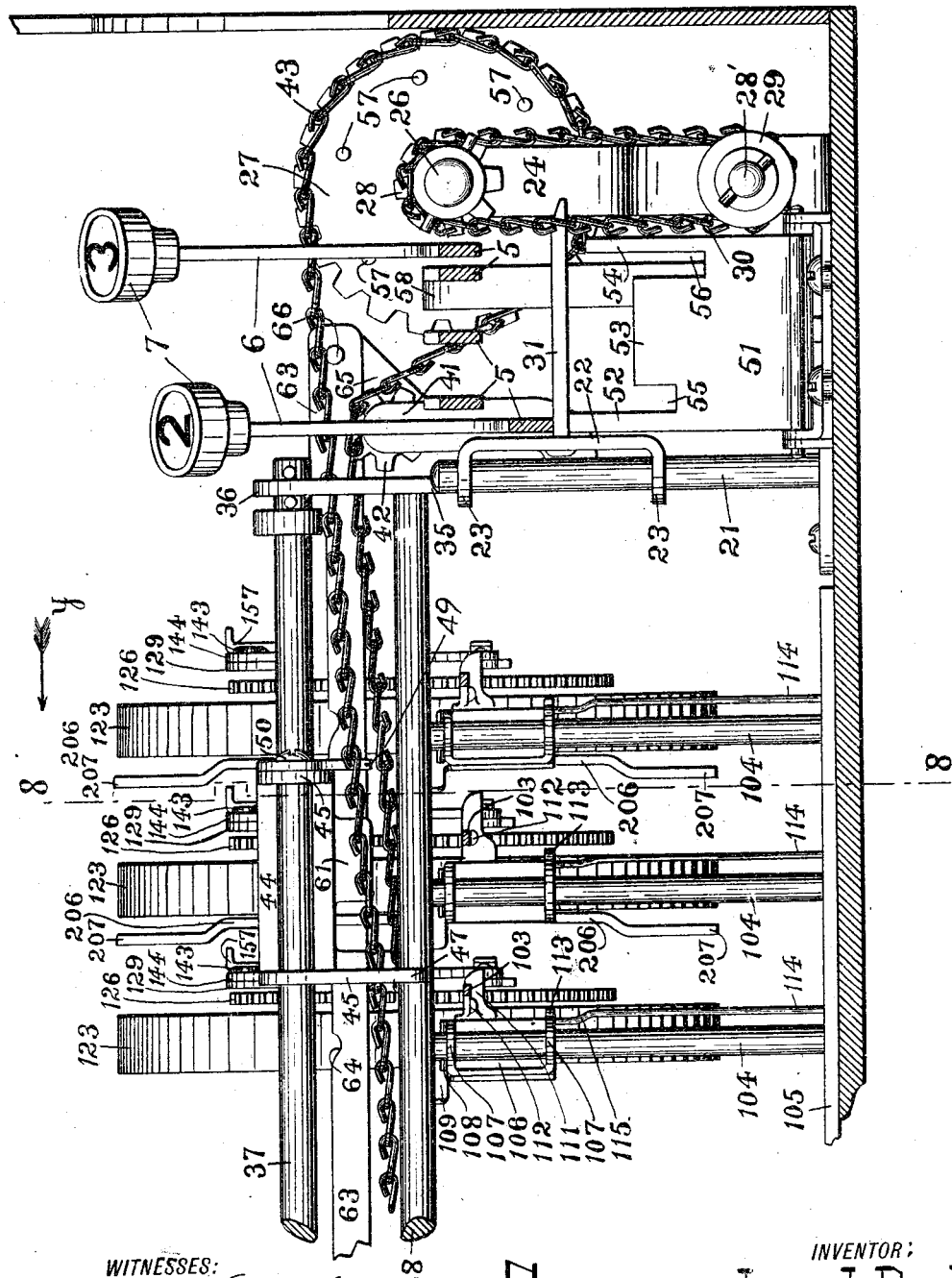
Figure 8:
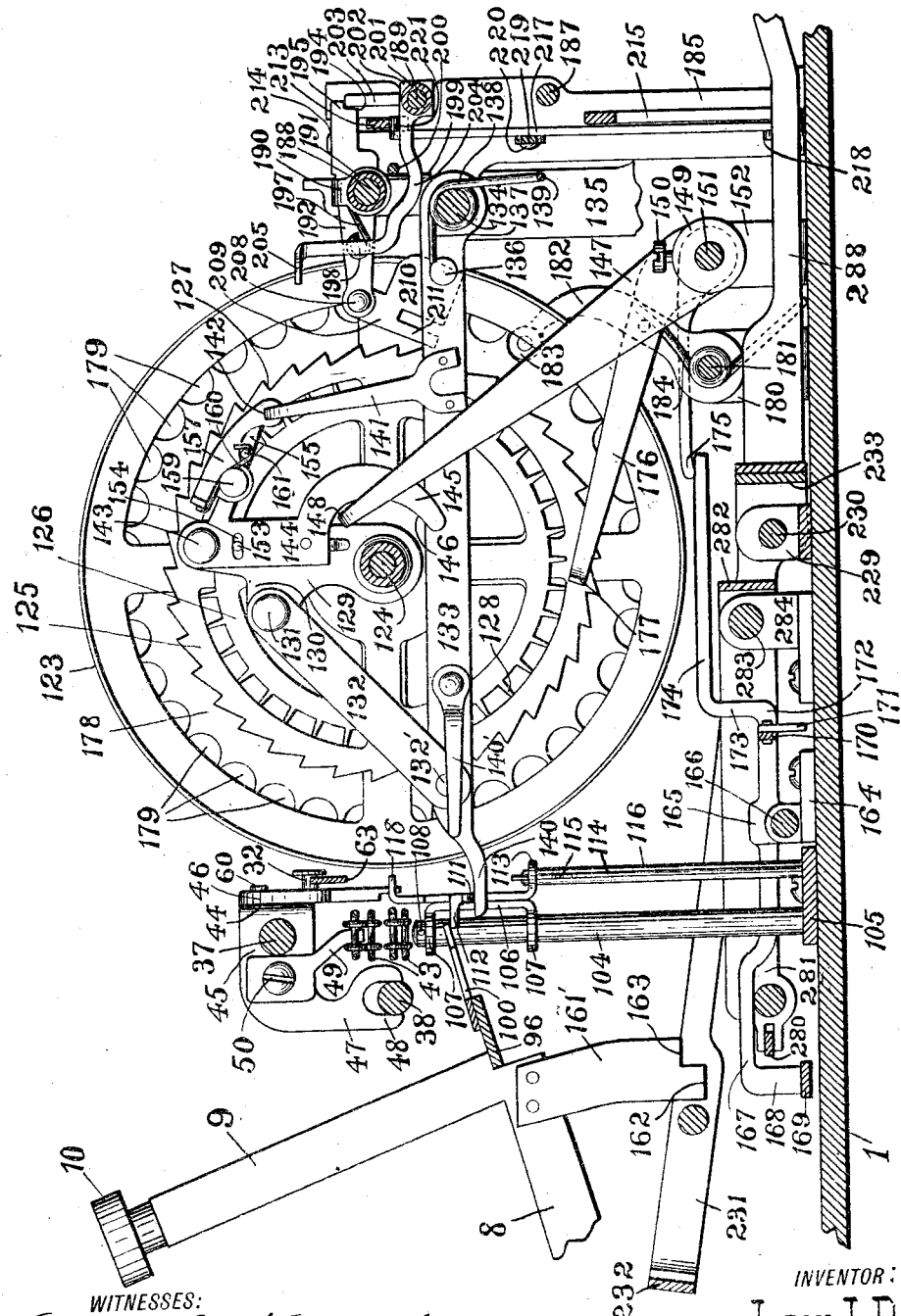
Figure 9:
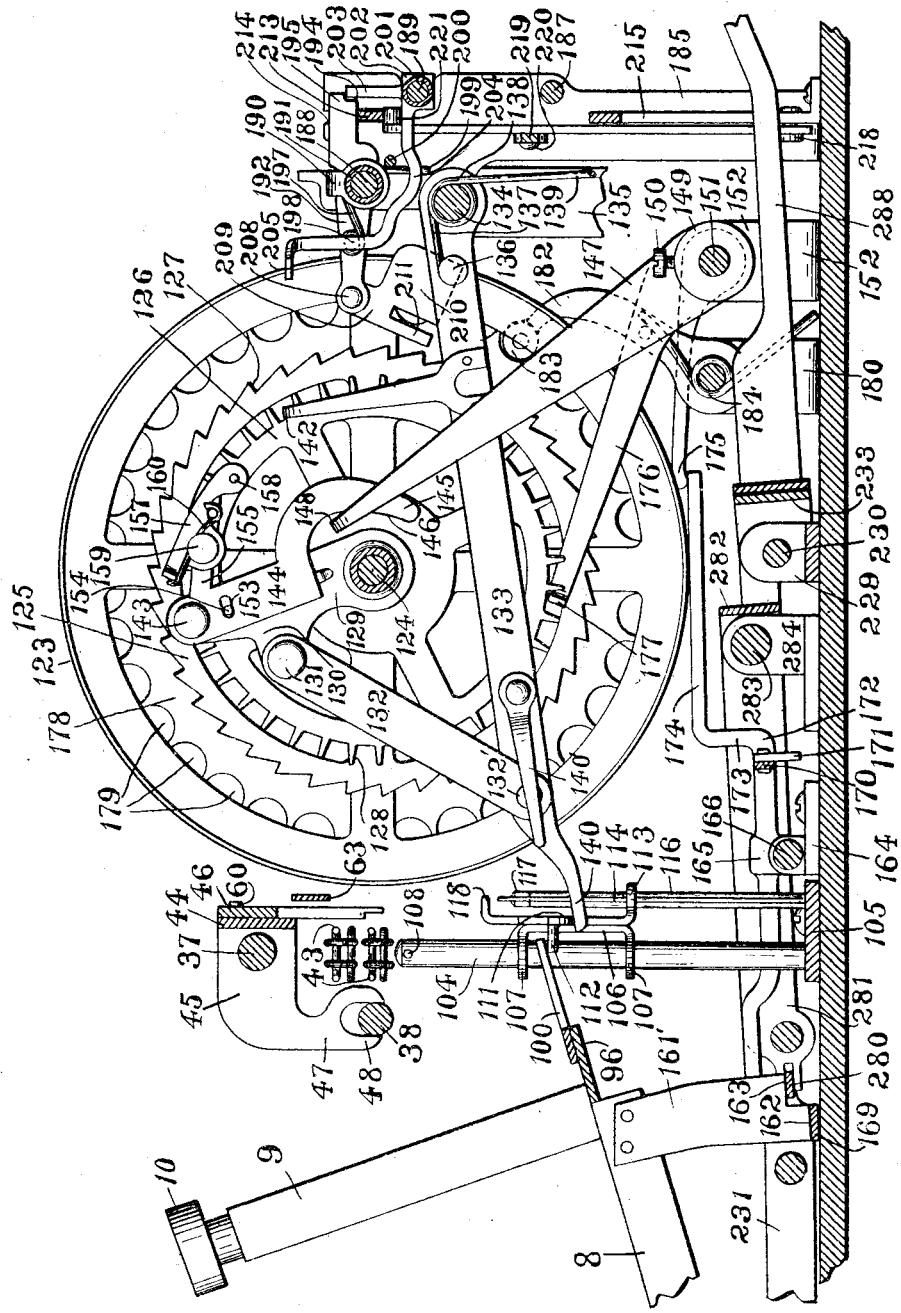
Figure 10:
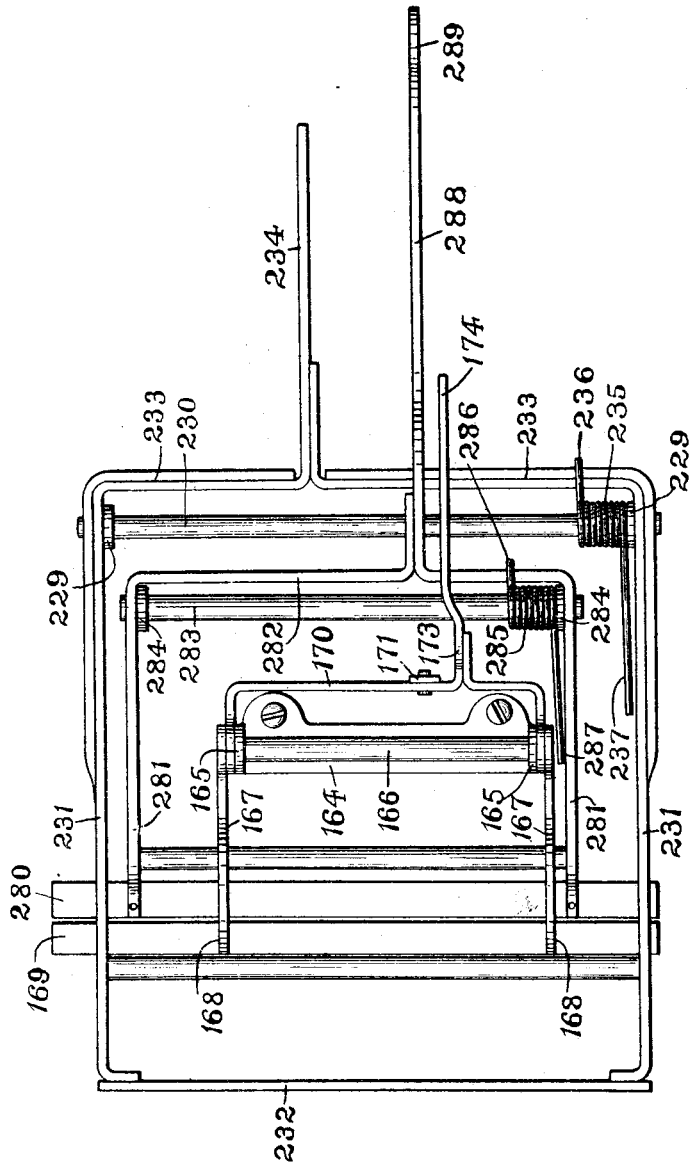
Figure 11:
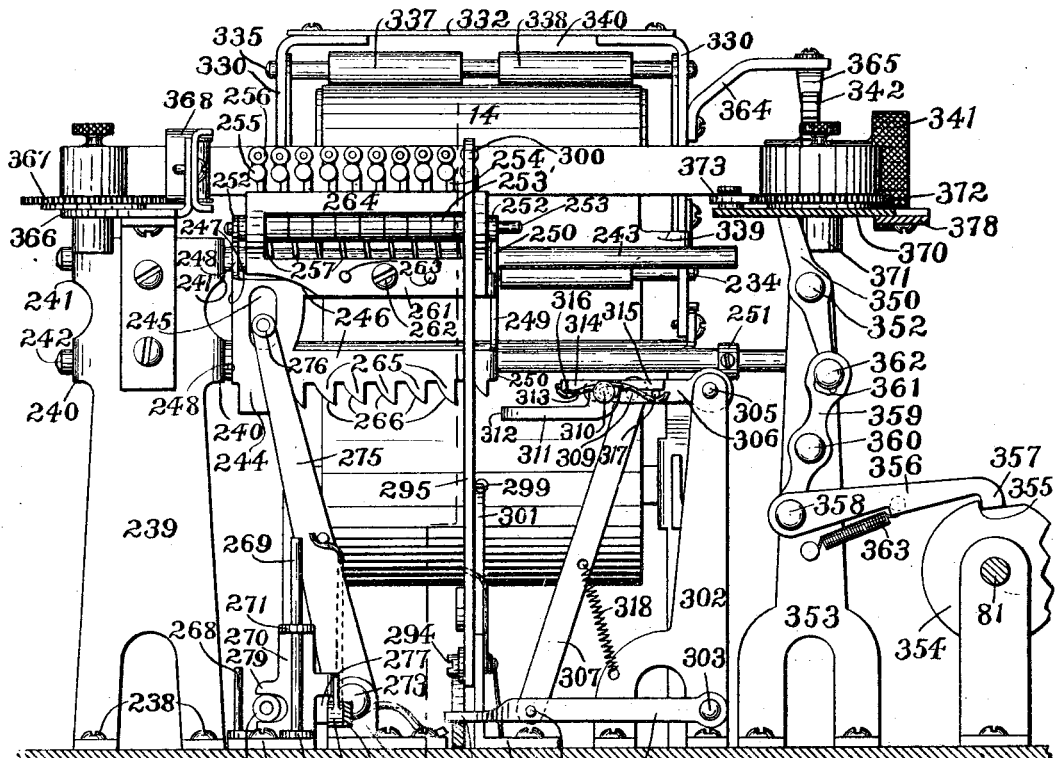
Figure 13:
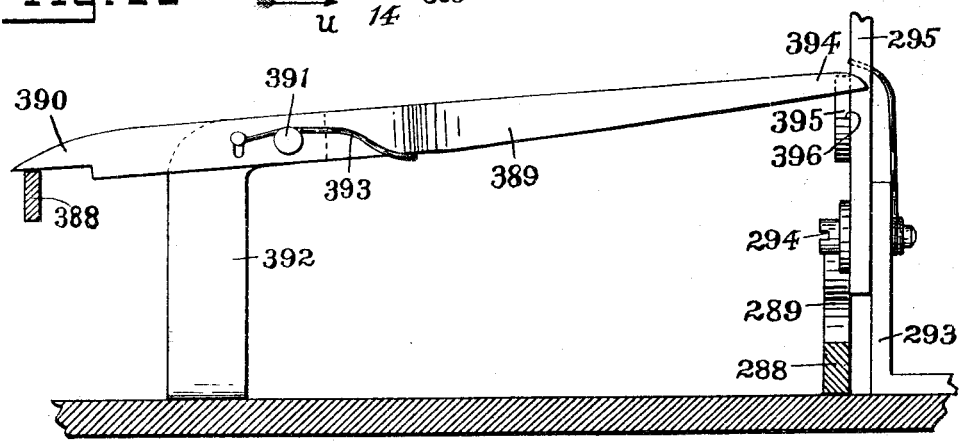
Figure 12:
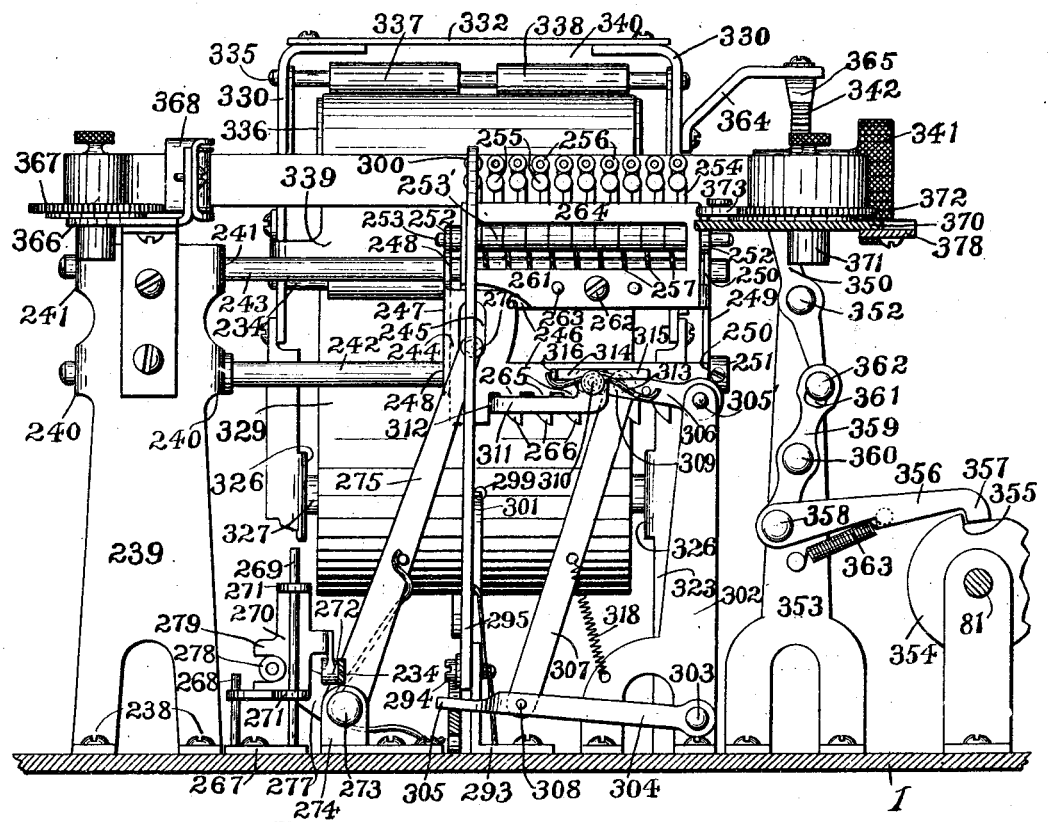
Figure 17:
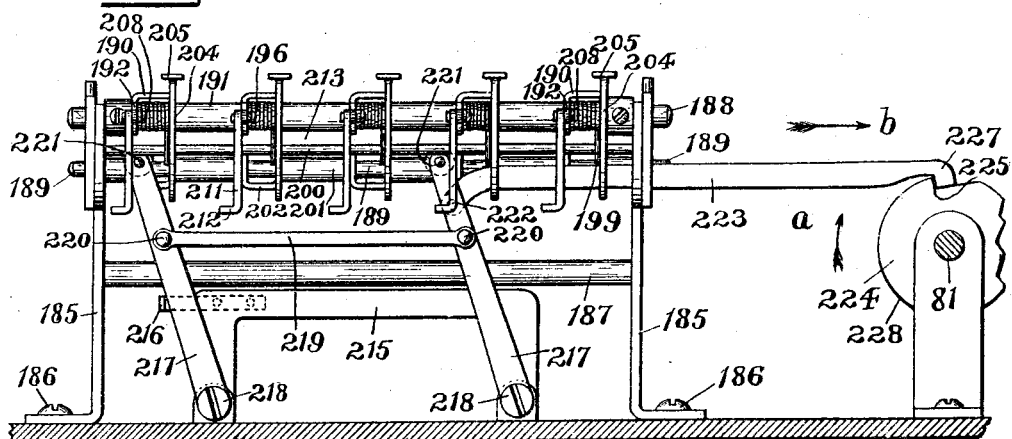
Figure 21:
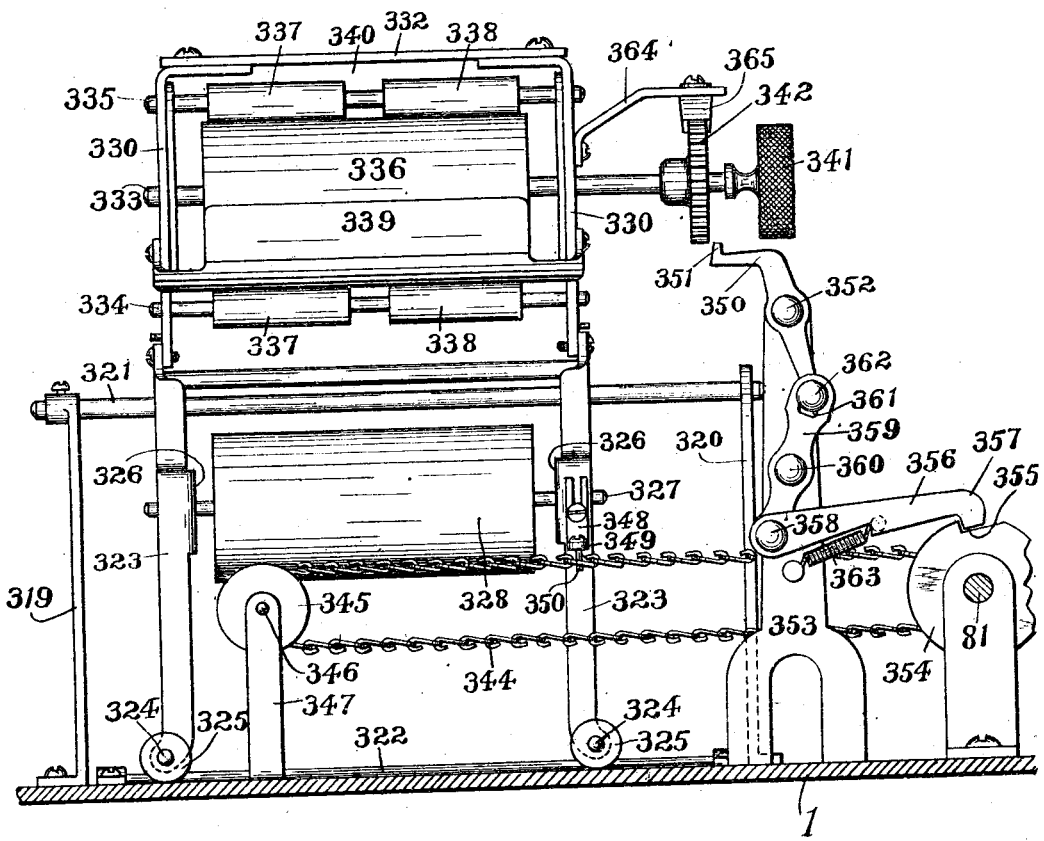
Figure 22:
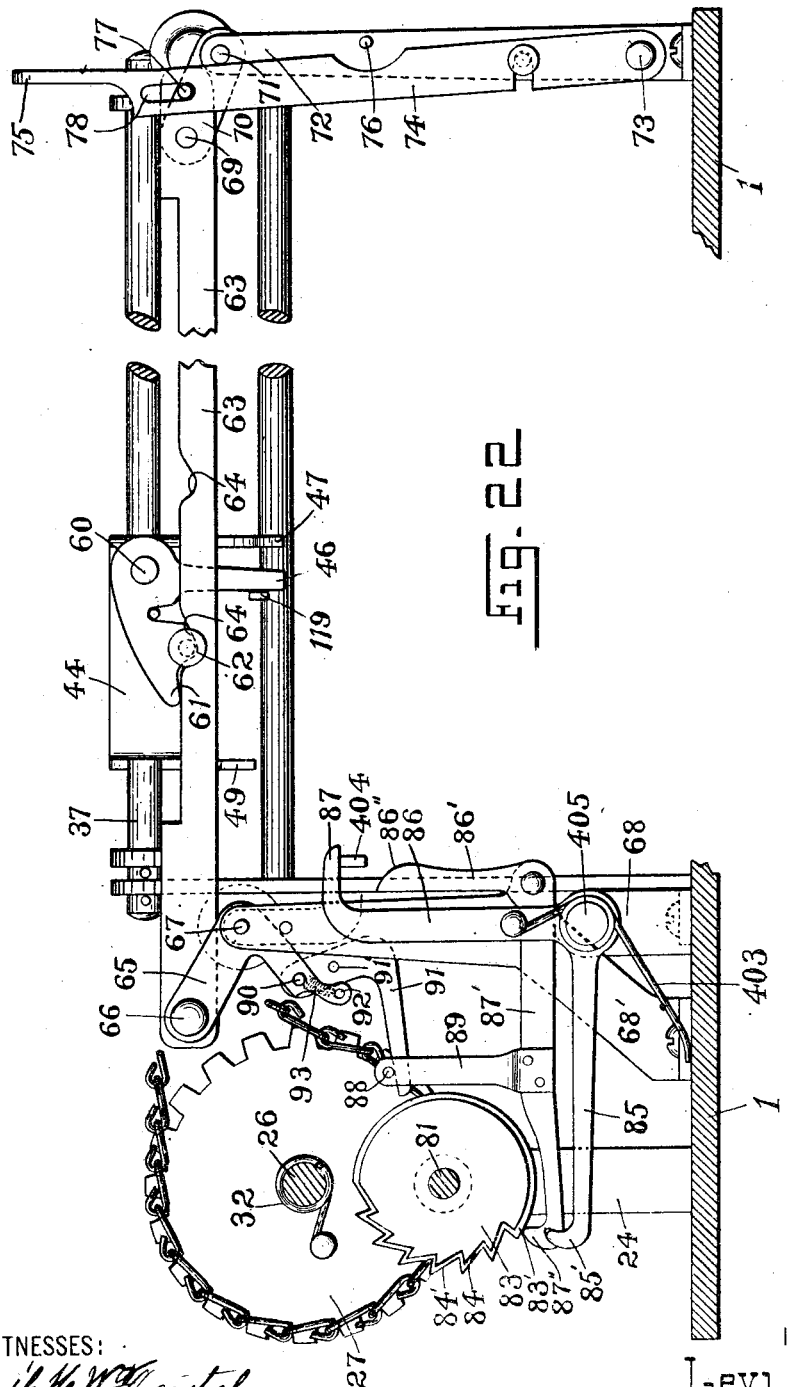
Figure 23:
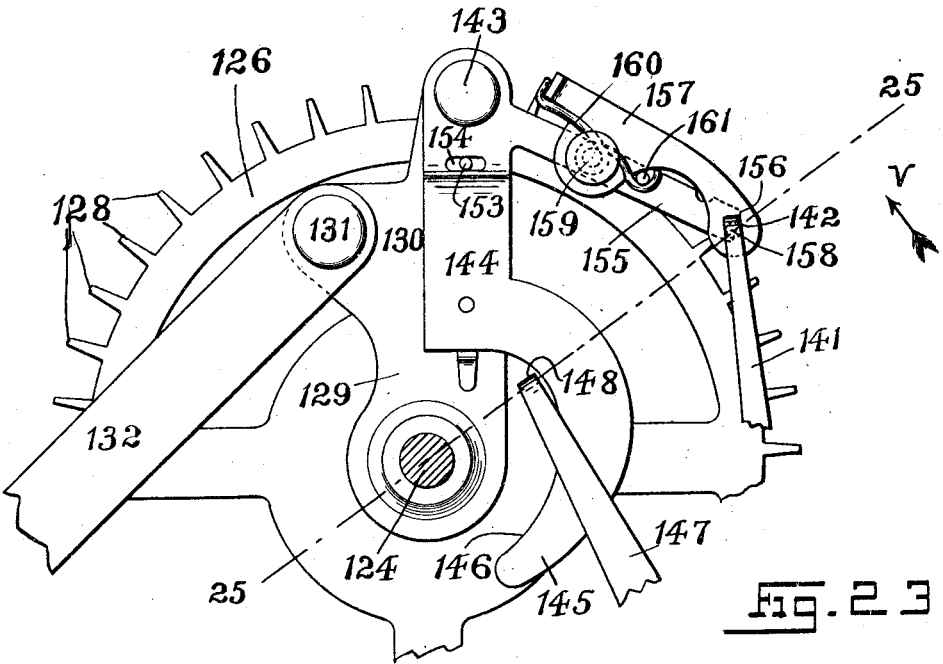
Figure 24:
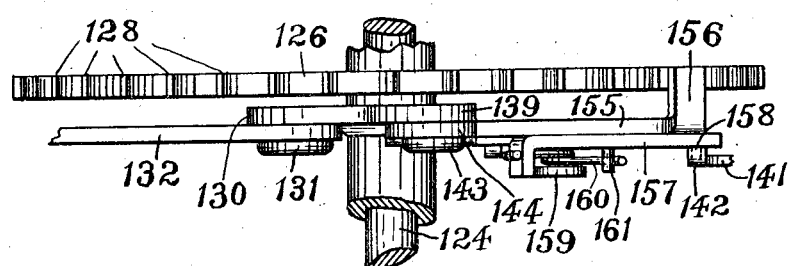
Figure 25:
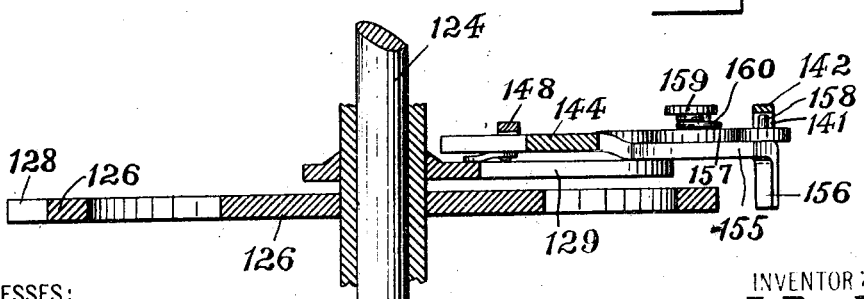

Figure 1 is a side elevation of an adding and printing machine, showing one embodiment of the principles of the present invention, the usual main shell or casing with which the machine is provided being, however, omitted from said view. Figs. 2, 3, 4 and 5 are detail plan views (made on an enlarged scale,) of the machine, Fig. 2 representing the lower left-hand portion, Fig. 3 the lower right hand portion, Fig. 4 the upper left hand portion, and Fig. 5 the upper right hand portion of the machine. Fig. 6 is a detail vertical sectional representation taken on line 6—6 in said Fig. 3, looking in the direction of the arrow $x$, with some of the parts of the mechanism omitted, and the parts which are represented being shown in their normal initial positions; and Fig. 7 is a similar sectional representation, taken on the same line, showing certain parts of the mechanism operated, and illustrating the first step in the operation of the machine. Fig. 8 is a detail longitudinal vertical section of portions of the machine, said section being taken on line 8—8 in said Fig. 6, looking in the direction of the arrow y; and Fig. 9 is a similar sectional representation of the same parts, said section being taken on line 9—9 in said Fig. 7, looking in the direction of the arrow y'. Fig. 10 is a detail plan view, made on a reduced scale, of certain parts of the mechanism below a horizontal plane passing through the line 10—10 in Fig. 8. Fig. 11 is a transverse sectional representation, taken on line 11—11 in Fig. 1, looking in the direction of the arrow z, said view illustrating more particularly in elevation, and in their normal initial positions, the type-carrying carriage and printing means of the machine, with the mechanism for operating said carriage and the printing means; and Fig. 12 is a similar view of the same devices and their parts, showing the type-carrying carriage moved laterally, and the various other parts of the mechanism being represented in their actuated positions. Fig. 13 is a detail transverse sectional representation of a portion of the frame-work of the machine and an elevation of a lever or arm employed for throwing the type-actuating hammer of the printing device out of action when the adding machine is to be used without printing. Fig. 14 is a detail sectional representation taken on line 14—14 in Fig. 11, looking in the direction of the arrow u, showing the type-carrying carriage and the type-actuating hammer in their normal initial positions; and Fig. 15 is a similar view of the parts represented in said Fig. 14, but showing the type-actuating hammer drawn back into its operated position, prior to being brought into forcible contact with the type-block. Fig. 16 is a detail view of a portion of the type-actuating hammer drawn back into its locked or held position by the lever or arm represented in said Fig. 13, when the adding machine is to be used without printing. Fig. 17 is a detail face view of a carry-over mechanism for operating the adding disk adjacent to the adding disk operated by a depressed number-lever, as in the case of passing from "9" to "10," or "99" to "100", etc. Fig. 18 is a detail longitudinal vertical section of the carry-over mechanism, showing in connection therewith and in elevation one of the adding disks, the parts being represented in their normal initial positions; and Fig. 19 is a detail reverse view of portions shown in Fig. 18, showing in connection therewith a gravity catch for producing the movement of the next-adjacent adding-disk mentioned in connection with said Fig. 17. Fig. 20 is an operated view of the parts represented in said Fig. 19, showing the gravity catch in its operative engagement with the adding-disk. Fig. 21 is a face view of the platen-carrying carriage, directly back of the printing mechanism, showing in connection therewith a means for laterally sliding said platen-carrying carriage into its initial print-receiving position and simultaneously rotating said carriage into position to receiving the next succeeding line of figures, after the preceding line of figures has been completed. Fig. 22 is a detail rear view, on an enlarged scale, of the releasing or setting mechanism or carriage, and certain other mechanism coöperating therewith. Fig. 23 is a face view of a portion of a disk-like member and mechanism coöperating therewith, for actuating the indicating or recording disk mounted upon the same shaft with said disk-like member, the said indicating or recording disk, however, not being shown in this view, and the said view being also made on an enlarged scale; Fig. 24 is a top-edge view of the parts represented in said Fig. 23; and Fig. 25 is a sectional representation of the same, said section being taken on line 25—25, looking in the direction of the arrow v. Fig. 26 is a detail view showing one of the ribbon-spools and ribbon, a standard and supporting portion for the spool, and means for producing an intermittent rotary motion of the spool.

Similar characters of reference are employed in all of the above described views, to indicate corresponding parts.

Before setting forth in detail the particular construction of the several devices and their parts which embody the principal features of the adding and printing machine illustrated in the accompanying drawings, I will first outline the general characteristics of the machine, in order that the relation of the principal devices and their parts to each other may be more clearly understood.

The machine comprises a suitable base and a detachable casing, the latter, however, not being shown in the accompanying drawings, and two sets of key-levers, and their indices, which are to be independently operated by the operator, and which sets of key-levers and keys for the sake of clearness are hereinafter respectively designated as the spacing keys and the digit-indicating keys. Then there is a laterally moving releasing of setting carriage, the movement of which is produced from right to left of the machine by the depression of one of the said spacing-levers, the movement of said releasing or setting carriage being regulated by the corresponding spacing-key which has been depressed, the said laterally moved releasing or setting carriage releasing for its operation, a corresponding and normally locked registering or adding disk. The number of such registering or adding disks is one more than the number of the spacing keys. These digit-indicating key-levers actuate and operate a suitable mechanism which determines the extent of the rotary movement of the said registering or adding disks, and the said digit-indicating key-levers also actuating and operating a printing-mechanism for printing upon a piece or strip of paper the desired numbers in horizontal rows, and vertically in a column, the aggregate of said column of numbers, when completed, being exposed to view upon the number of operated registering or adding disks, whereupon, by consecutively depressing the correspondingly numbered digit-indicating key-levers, the "total-amount" of the column of figures can be printed upon the strip of paper at the bottom of the column of figures. Suitable mechanism is also provided for throwing the several registering or adding disks out of operation, and simply causing the digit-indicating key-levers to actuate and operate the printing mechanism, which may be brought into operation at the time of printing the "total-amount" at the bottom of the column of numbers, so that the sum-total or aggregate amount will remain exposed to the view of the operator, and thereby serve as a guide or check to the operator, that the correct "total-amount" is being printed. The machine is also provided with a suitable means for returning all of the previously operated registering or adding disks to their normal initial or zero-indicating positions after the desired numbers or figures have been printed and their sum-total or aggregate amount has also been produced upon the strip of paper. The machine is constructed, also, in such a manner, that during the depressions of the digit-indicating key-levers the said releasing or setting carriage is intermittently or by a step-by-step movement returned from left to right of the machine to its normal starting position, at rest, it being understood that during its return-movement the said releasing or setting carriage is for the time being arrested in front of and with relation to the next lower and adjacent registering or indicating disk, so as to permit of the successive rotary movements of the next succeeding disks, as will be clearly evident. The several registering or indicating disks are also provided with suitable mechanism for producing the rotary movements of any two adjacent disks simultaneously, when the movement of the disk is from the indicating-space 9 to 10, or from 99 to 100, or from 999 to 1000, and the like.

As has been stated, the entire mechanism is inclosed in a suitable casing, but which is not shown in the accompanying drawings, and which may be made of any suitable material, being correspondingly shaped, as may be necessary, and being of any desired surface-ornamentation.

Figure 3:
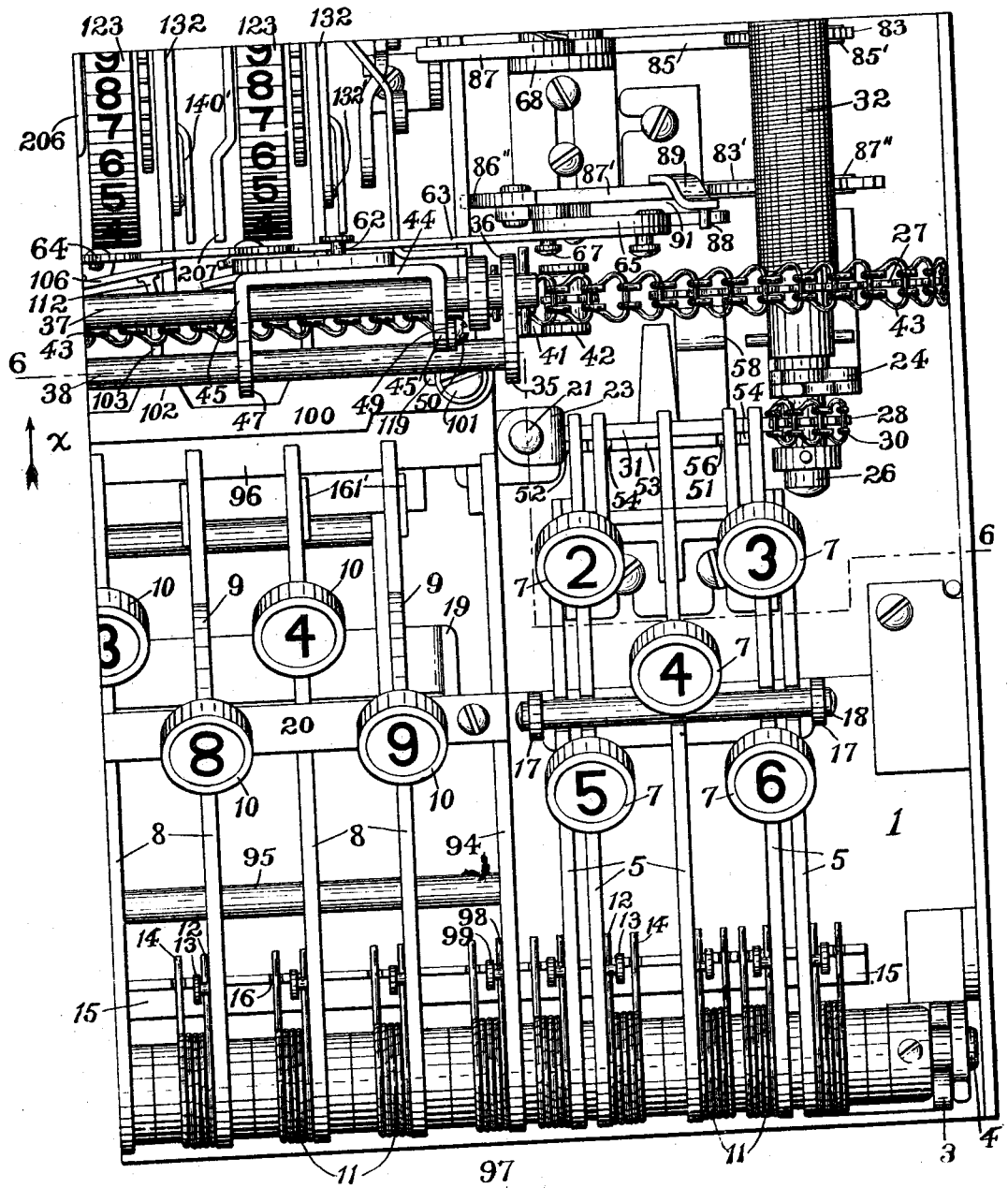

Referring now to the several figures of the drawings, the reference-character 1 indicates a suitably formed base-plate which is provided at its front edge with suitably disposed bearing-posts, as 2 and 3, in which is suitably mounted a non-rotative rod 4. Pivotally arranged upon the said rod 4, so as to be capable of the necessary depression, are the previously-mentioned spring-controlled key-levers, which are indicated by the reference-character 5, and of which there may be any desirable number, each key-lever 5 being provided with an upwardly extending arm 6 which carries upon its upper end-portion a finger-piece 7 provided with an indicating number, substantially as illustrated in Figs. 1, 3 and 6 of the drawings. The previously-mentioned digit-indicating key-levers are also pivotally arranged upon said rod 4, so as to be capable of the necessary depression, said key-levers being indicated by the reference-character 8. Of these digit-indicating key-levers there are always ten, each key-lever being provided with an upwardly extending arm 9 which carries upon its upper end a finger-piece 10. These finger-pieces are respectively provided with the several digit-representing symbols 0, 1, 2, 3, 4, 5, 6, 7, 8 and 9, all of which will be seen from an inspection of Figs. 2, 3, 8 and 9.

To return the said key-levers 5 and 8 to their normal positions, after depression, correspondingly formed springs 11, which encircle the said rod 4, are provided, the free end-portions 12 of said springs being in pressing engagement with suitable projections or pins, as 13, which extend from the sides, near the pivoted end-portions, of the respective key-levers 5 and 8, and the other free end-portions 14 of said springs resting in suitable slots, as 16, of a suitable spring-holder 15, and being in pressing engagement therewith. The said spring-holder 15 is rigidly and suitably secured upon the said base-plate 1, below the said key-levers 5 and 8, substantially in a manner illustrated in Figs. 2 and 3 of the drawings. To limit the return-action of the said springs, and the corresponding return-movements of the said key-levers 5, suitable posts 17 are secured upon the said base-plate 1, said posts 17 being connected by means of a bar or rod, as 18, at a point above the said key-levers 5, and against which the depressed key-lever 5 is returned by the action of the corresponding spring 11, so as to arrest its returning movement in an upward direction, and to stop the key-lever in its proper place. In a similar manner, to limit the return-action of the springs 11 which co-act with the key-levers 8, and, likewise, to limit the return-movements of said key-levers 8, suitable posts 19 are secured upon said base-plate 1, said posts 19 being connected by means of a bar or plate, as 20, at a point above the said key-levers 8, and against which the depressed key-lever 8 is returned by the action of the corresponding spring 11, so as to arrest its returning movement in an upward direction and to stop the key-lever in its proper place. Suitably disposed upon the said base-plate 1 is a vertically extending post, as 21, upon which is slidably arranged a bearing-piece or carrier 22, said bearing-piece or carrier being provided with perforated lugs or ears 23 which are slidably fitted upon the said post 21, and by means of which the said bearing-piece or carrier is capable of reciprocatory movements, in the manner and for the purposes hereinafter more fully set forth. The said base-plate 1 is also provided with a pair of bearing-posts or brackets, as 24 and 25, in which is rotatably mounted a shaft or spindle 26, upon which is suitably mounted a toothed chain-wheel, as 27, and a sprocket-wheel 28 of smaller diameter than the chain-wheel 27. The said shaft or spindle 26 extends longitudinally of the machine, and extending longitudinally from the bearing-post or bracket 24, and vertically below the said shaft or spindle 26, is a stud 28', upon which is rotatably mounted a guide-roller or wheel 29. A link-chain 30 passes over the said sprocket-wheel 28, being in operative engagement with the sprocket-teeth of said wheel, and the said guide-roller or wheel 29, the latter acting as a bearing or guiding element for the proper movement of the said chain, and, the movement of the said chain for operating the said shaft or spindle 26 is made by a laterally extending finger 31 which extends from the said bearing-piece or carrier 22 and has its free end-portion extending into and in operative engagement with one of the links of said chain 30 as shown in Figs. 1 and 7.

The downward movement of the said bearing-piece or carrier 22 is produced by the contact of any one of the spacing key-levers 5, when depressed, with the said finger 31, as will be evident from an inspection of Figs. 3 and 7, the said finger 31 by its engagement with the link-chain 30 rotating the shaft or spindle 26 and the chain-wheel 27, mounted thereon, in one direction for moving the releasing or setting carriage, heretofore mentioned, in a direction from right to left of the machine, in the manner and for the purposes to be hereinafter more fully described. The return-movement of the said shaft or spindle 26 is produced by means of a coiled spring 32 which is mounted upon said shaft or spindle, said spring having its one end-portion suitably connected with the said chain-wheel 27, and the other end of said spring being in engagement with a suitably formed arm or projection, as 33, connected with and extending from the said bearing-post or bracket 25. Suitably mounted upon the said base-plate 1 are a pair of similarly formed posts 34, each post being made with an angular and slightly forwardly projecting part 35, and extending rearwardly from each part 35 is a bearing-portion 36. Suitably mounted in the said bearing-portions 36 is a supporting rod or bar 37, upon which the previously-mentioned spacing-means or carriage is slidably or movably supported as will be evident from an inspection of Figs. 2, 3, 6, 7, 8, 9 and 23 of the drawings. Connected with the parts 35 of said posts 34 is a guide-rod or bar 38, and the reference-character 39 indicates a suitably grooved wheel or roller, which is suitably and rotatably mounted in a suitably formed bearing-member 40. Suitably connected with the post 34, located nearest the chain-wheel 27, is a suitably formed bearing-member 41 in which is suitably and rotatably mounted a grooved wheel or roller 42, in the form of an idler. A link-chain 43 passes around the previously-mentioned chain-wheel 27, its links being in operative engagement with the sprockets of said chain-wheel, said chain passing over and around the said grooved wheel or roller 39, and the idler 42 which serves as a bearing and proper guide for the lower retaining portion of the link-chain before it passes upon the said chain-wheel 27. The releasing or setting carriage consists, essentially, of a plate-like body 44 provided with a pair of perforated members or bearing-portions 45, suitably and slidably mounted upon the said supporting rod or bar 37, said body 44 being provided upon the back thereof with a pivoted arm or finger 46, and one of said members 45, having a downwardly extending element 47, in the form of an arm, which is suitably forked at its lower free end-portion, as at 48, said forked end-portion 48 embracing the said guide-rod or bar 38, and being slidably arranged with relation to the said rod or bar 38. The reciprocatory sliding movements of the said releasing or setting carriage are produced by the movements of the said link-chain 43, and are caused by a downwardly extending finger 49 which is suitably secured to the other of said bearing-portions 45 by means of a screw 50, or otherwise, and has its free end-portion extending into operative engagement with one of the links of the link-chain 43 as represented more particularly in Figs. 6, 7, 8 and 9.

The downward movements of the several spacing-key-levers 5, of which only an arrangement of five is shown in the accompanying drawings, but the number of which may be increased, if desired, are variously limited by a plate 51, said plate being suitably mounted upon the base-plate 1 and having a slight pivotal movement in a direction toward the face of the chain-wheel 27. The upper edge-portion of the said plate 51 is made with the extensions 52, 53 and 54, see Fig. 7, and the slotted portions 55 and 56, corresponding to the number of the said spacing-key-levers 5, said extensions and slotted portions varying, respectively, in their lengths and depths, as shown in said figure. In depressing the various key-levers 5, they are respectively brought into arresting engagement with the upper marginal edge-portions of the respective extensions or the slotted portions, so that the downward movements of the several key-levers 5 are variously limited, whereby the rotary movement of the chain-wheel 27 is variously controlled, as will be evident, and the laterally sliding movement of the releasing or setting carriage is likewise limited and controlled, so as to be moved from right to left of the machine, and stopped in the desired position, in front of the proper registering or adding disk which is to be released and set for its rotary action. That the momentum of the rotary action of the chain-wheel 27, and the other rotating parts, when the key-lever 5 is forcibly depressed, may not carry the said releasing or setting carriage past the proper registering or adding disk, which is to be released, the said chain-wheel 27 is provided upon its face toward the said pivoted plate 51, with a series of properly placed lugs or projections, as 57, which serve as stops, and in the path of the proper lug or projection is moved the upper free end-portion of a stop-arm 58 which is suitably secured upon said plate 51 by means of a rivet 59, or otherwise, when the said plate 51 is slightly brought into its tilted relation by the downward pressure of the depressed key-lever 5 upon said plate 51, so as to positively arrest the rotary movement of the chain-wheel 27 at the proper time, and in consequence thereof likewise arresting the movements of the parts which are actuated by the said chain-wheel.

To produce the intermittent or step by step return movement of the said releasing or setting carriage, from left to right of the machine, and to successively stop the said carriage in front of each successive and next lower registering or adding disk, the arm or finger 46 is pivoted as at 60, to the said plate-like body 44 of the carriage, and is formed with a gravity-dog 61, see more particularly Fig. 22 of the drawings, said arm or finger 46 and dog 61 being made in the form of a bell-crank, and said dog 61 being provided with a projection or lug, as 62, which successively drops into suitably spaced recessed portions 64 in a band 63. This band 63 is provided at its one end-portion with a bell-crank 65, pivoted thereto, as at 66, the said bell-crank 65 being also pivotally connected, as at 67, with a post 68' which is suitably mounted upon the base-plate 1. Pivotally connected with the opposite end-portion of said band 63, as at 69, see Fig. 22, is a short connecting arm 70, said arm 70 being pivoted, as at 71, to a post 72 which is also suitably mounted upon the said base-plate 1. Pivoted at 73 upon the said post 72 is a lever 74 which extends above the said band 63 and is provided with a fingerpiece 75 for the manipulation of said lever 74, when it is desired to operate the printing mechanism without actuating the indicating or recording disks. The pivotal movement of said lever 74 is limited by a pin 76, or other suitable stop, against which the edge of said lever is brought when manipulated by its fingerpiece 75, and projecting from the said end-portion of the band 63 is a pin 77 which extends into an elongated opening or slot 78 in said lever 74. Thus, when the said lever 74 is moved upon its pivot 73, the slotted portion of the lever 74 causes said pin to move in an upward direction, whereby the strip or band moves upwardly in a vertical plane, so as to force the projection or lug 62 of the gravity dog 61 out of the recessed portion 64 of the strip or band 63, the purpose of which will be presently more fully described. That the said carriage 44 may be released for the purposes hereinabove stated, the previously-mentioned shaft or spindle 26 is provided with a pinion 79 which meshes with a toothed or gear-wheel 80 secured upon a second longitudinally extending shaft 81, vertically in alinement below the said shaft 26 as shown in Figs. 1, 5, 6 and 7, said shaft being rotatably mounted in bearing-portions of the bearing-post or bracket 25 and another bearing-post or bracket 82 which is also suitably mounted upon the said base-plate 1. Suitably secured upon the said shaft or spindle 81 is a disk, as 83, formed in part of its marginal edge-portion with a number of ratchet-like teeth 84, see Figs. 1 and 22, the number of said teeth being at least as many as the number of recording or indicating disks. Pivotally connected with the post 68 is a bell-crank comprising an arm 85 and a second trip-arm or member 86, which is formed with a tripping finger 87, as shown in said Fig. 22, the arm 85 being provided at its free end with a hook-shaped portion 85'. The said tripping finger 87 is normally engaged upon its under side, so as to be brought into its normally raised relation, against the action of a suitably disposed spring 403, by a rearwardly projecting stem or finger 404 which extends from a laterally arranged bar 96 of a rock-frame herein-after mentioned. A downward movement of the said rock-frame produced by a depressed key-lever 9, removes the said stem or finger 404 from its engagement with the under side of said tripping finger 87. During the depression of a key-lever 5, the toothed disk 83 has received a rotary motion in proportion to the distance that the spacing carriage has been moved from right to left. The stem or finger 404 having moved away from said tripping finger 87, as has been stated, the bell-crank just mentioned, which is pivoted at 405, turns upon its pivot, and also the arm 85 slightly in an upward direction, due to the action of the spring 403, and causing its hook-shape end 85' to engage and lock with one of the ratchet-teeth of the disk 83, thereby preventing any return of the carriage 44, during the operation of printing. As soon as the operator releases the depressed key-lever 9, the bell-crank, and other parts just mentioned return to their normal initial positions, except the disk 83 is rotated a distance equal only to the space between two of its adjacent teeth 84. The spacing-carriage in the meantime, owing to the action of the spring 93, has moved from left to right, in position in front of the next-lower indicating or recording disk and there held until another key-lever 9 is depressed for operating the several parts in the manner just described.

When it is desired to print, without operating the indicating or recording disks, the finger-piece 75 is pushed from right to left, whereby the band 63 is moved upwardly, as has been stated. This upward movement of the said band 63 causes a corresponding pivotal movement of the gravity dog 61, thereby moving the lug or projection 62 of the said dog 61 out of the recessed part 64 of the band 63, so as to cause the said lug or projection 62 to rest upon the straight part of the upper marginal edge of the said band 63. This action also raises the pivoted arm or finger 46 from its engagement with the indicating or recording disk-releasing mechanism, hereinafter described, so as to produce an inoperative relation at that time of the said indicating or recording disk or disks.

Referring once more to Fig. 22 of the drawings, it will be noticed that the spindle 81 has suitably mounted thereon a disk or wheel 83', similar to the disk or wheel 83, said disk 83' being also formed in part of its marginal edge-portion with a number of ratchet-like teeth 84', corresponding to the number of the teeth upon the disk 83. Pivotally connected with a post 68' is a suitably formed bell-crank comprising two arm-like members 86' and 87', the outer marginal edge-portion of the said member 86' formed with a suitably curved projecting portion, as 86'', and the member 87' being provided upon its free end-portion with a hook-portion 87'. Connected with and extended in an upward direction from the member 87' is an upright or finger 89 carrying near its upper end portion a laterally projecting pin or projection 88. Pivotally connected with the previously-mentioned bell-crank 65, as at 90, is another bell-crank 91', and which is provided with a stop 91 adapted to be engaged by a stop or other suitably-shaped end-member 92, the return of the said parts being assisted by a spring 93, and the weight of the band 63, and parts connected therewith.

The band 63 being raised in the manner of and for the purposes above described, and the releasing or setting carriage having moved forward from right to left, the bell-crank 65 actuates the bell-crank 91 against the projection or pin 88, thereby lifting the upright or finger 89 and raising the arm-like member 87', and bringing the hook-shaped end 87'' into its retaining or locked engagement with the ratchet-teeth 84' of the disk-like member 83'.

A downward movement of the previously-mentioned rock-frame produced by a depressed key-lever 9 actuates the mechanism just described, so that the hook-shaped end 87'' of the member 87' is again thrown out of its engagement with the ratchet-teeth 84', the rearwardly extending finger 404, as it is being lowered sliding against and upon the outwardly curved portion or projection 86'' of the arm-like member 86', and thereby such disengaged relation of the hook-shaped end 87'' with the said ratchet-teeth, as is self-evident from an inspection of Fig. 2 of the drawings. At the same time, the withdrawal of said finger 404 from its operative engagement with the tripping finger 87 produces the locked relation of the previously-mentioned toothed disk-like member 83 in the manner heretofore described.

The locking relation of the two disks 83 and 83' is produced alternately, as will be evident from above, and the purpose of such alternate locking of the said disks is to prevent, at proper times, the rotary movement of the shaft or spindle 26, and to lock or hold the platen and paper roll-carriage against movement during the printing operation.

Having in the foregoing described the mechanism for actuating by means of the spacing key-levers 5, the releasing or setting carriage for primarily releasing the registering or indicating disks, I will now describe, in particular, the mechanism for operating the said registering or indicating disks, by means of the downward motion of any one of the previously-mentioned digit-indicating key-levers 8.

Pivotally mounted upon the previously-mentioned non-rotative rod 4 is an actuating or rock-frame consisting, essentially, of a pair of rearwardly extending arms 94 which are connected by means of a laterally extending bar 95, near the ends where the said arms are pivotally mounted upon said rod 4, and by means of a second laterally extending bar 96 previously mentioned, which is connected with the rear end-portions of the said arms 94, see Figs. 2 and 3, the said rock-frame, after it has been depressed, being returned upwardly into its normal initial position, by means of a spring 97 which encircles the said rod 4, and the free end-portions 98 of which engage, respectively, with suitable projections or pins, as 99, which extend from the sides of said arms 94, near the pivoted end-portions thereof, and with the previously-mentioned spring-holder 15. Suitably mounted upon the said laterally extending bar 96 is an actuating plate 100 which is suitably secured upon the said bar 96 by means of screws 101, and is formed along its rear marginal edge-portion, and at proper intervals, with the V-shaped extensions or lugs, as 102, and each extension and lug 102 being provided with a rearwardly extending finger 103, as clearly shown in said Figs. 2 and 3.

The reference-character 104 indicates a series of vertically disposed posts, extending upwardly from a bar 105 which is secured upon the base-plate 1 of the apparatus, and slidably arranged upon each post 104 is a slide. Each slide consists, essentially, of a main body, as 106, which is located upon the rear of the post 104, and each main body 106 being provided with forwardly extending and perforated guide-lugs 107, embracing the post 104 in such a manner that each slide is slidably mounted upon a post 104. Extending through each post 104 is a pin 108, the said pins having for their purpose to limit the upward movements of the said slides upon the respective posts, all of which will be clearly evident from an inspection of Figs. 6, 7, 8 and 9 of the drawings. The body 106 of each slide is also provided with a laterally projecting lug 109, and extending rearwardly from each lug 109 is a projection or pin 119, adapted at the proper time to be engaged by the previously mentioned arm or finger 46 which is pivotally attached to the body 44 of the spacing means or carriage, as has been herein-before stated. The lugs 109 of the said slides, looking at the front of the machine, project outwardly from the left-hand edge-portion of each body 106. Projecting laterally from the opposite edge-portion of each body 106 is a lug 111 upon the front face of which is a forwardly extending and tapered finger, as 112. Projecting from the same edge-portion of each body 106 is a perforated ear 113, into and through which extends an upright or vertically disposed spring-rod 114, the said spring-rods 114 being slightly bent at their upper end-portions, as at 115, and having their lower end-portions permanently fixed to the previously mentioned bar 106. Directly back of said series of posts 104, and longitudinally of the machine in alinement with said posts 104, is a second series of posts 116, said posts 116 being also fixed at their lower end-portions to the said bar 105. The said posts 116 are shorter than the posts 104, see Figs. 8 and 9, and at their upper end-portions the said posts 116 are cut away, so as to form off-sets, as 117, into resting engagement with which the bent-portions 115 of the spring-rods 114 force the said perforated ears 113, when the slides are in their normally raised positions, so as to support the said slides in their raised positions upon their respective rods. And retain the said slides in a slightly angular relation with respect to a single vertical plane passing through the axes of the several posts 104. The body 106 of each slide is further provided with a rearwardly extending lug or stud 118 which moves against the post 116 when the perforated ear 113 has been forced from its supporting engagement with the off-set 117, by the sliding and passing over action of the pivoted arm or finger 46, as the releasing or setting carriage is passed from right to left, over the projection or finger 110 of the lug 109, so as to bring the said releasing or setting carriage into its arrested position, until released by the downward movement of an indicating key 8, in the manner to be presently described. This action and engagement of the parts just described, causes a partial rotary motion of the proper slide upon its rod 104, so as to bring the slide into proper alinement, and the tapered finger 112 of the properly rotated slide into its proper position for engagement of the proper finger 103 connected with the respective extension or lug 102 of the actuating plate 100

As has been stated, the previously-mentioned actuating plate 100 is secured upon the said bar 96 by means of the screws 101, but, after depression and during the upward return movement of the actuating plate 100 it shall have a slight movement upon the bar 96, from left to right; and, to accomplish this, the said plate is provided with the elongated holes 119 through which the shanks of the screws 101 extend, the said plate 100 being retained in its normal position, indicated more particularly in Fig. 2 of the drawings, by means of a long spring 120 which is suitably secured at one end, as at 121, to the side of the arm 94 of the rock-frame, and has its opposite end-portion in operative engagement with a pin or projection, as 122, extending from the lower face of the said plate 100.

The previously-mentioned recording or indicating disks, of which there may be any suitable number, are indicated by the reference-character 123, the several disks being suitably spaced apart, and being loosely and rotatably mounted upon a laterally extending rod or shaft 124. This rod is nonrotatably disposed in suitably formed bearing-members 125' extending upwardly from the base-plate 1. Connected with and permanently affixed to the hub of each disk 123 are a pair of disk or wheel-like members 125 and 126, the member 125 being provided with ratchet-teeth 127, arranged as shown in Figs. 8 and 9 of the drawings, and the member 126 having extending in radial lines from its circumferential edge, a series of suitably disposed fingers or projections, as 128, the said members 126 serving as prime movers of the hubs of the several disks 123 and the members 125, as will be clearly evident. Loosely mounted upon the said laterally extending rod or shaft, and oscillatorily disposed upon the side-faces of the respective members 126, are suitably formed arms or levers, as 129, each arm or lever 129 being provided with an ear or lug 130. Pivotally connected with each ear or lug 130, by means of a pin 131, is a link 132, each link 132 being pivotally attached at its opposite end-portion, by means of a pin 132' to an arm or lever 133. These arms or levers 133 which correspond in number to the number of disks 123 are pivotally mounted upon a laterally extending rod 134, supported in suitably disposed bearing-members 135 which extend upwardly from the base-plate 1. Each arm or lever 133 is provided near its point of pivotal support with a projection, as 136, with which is operatively connected the one end-portion 137 of a coiled spring 138, each spring 138 encircling the rod 134 and having its other free end-portion 139 extending downwardly and suitably secured to the base-plate 1. The purpose of these springs is self-evident. If desired, each arm or lever 133 may also be provided with a leaf-spring, as 140', having a portion thereof bearing directly upon the pivotal connection of the link 132 and the lever or arm 133, so as to take up any lateral play of the parts, and to prevent the accidental separation of the same. At their forward end-portions, the said levers or arms 133 are each provided with finger-like extremities, as 140, adapted to be engaged, for downward depression, by the laterally extending lug 111, herebefore mentioned, of the slide 106 upon the post 104, which has been brought into its proper alinement, and is being actuated by the downward movement of the previously-mentioned rock-frame and the corresponding downward movement of the depressed key-lever 8. Each arm or lever 133 is also provided with an upwardly extending arm-like member 141, the upper free end-portion of which is provided with an angularly bent portion, as 142, extending laterally therefrom and toward the face of the disk-like member 126.

Pivotally connected with each arm or lever 129, herein-above mentioned, by means of a pivot-pin 143 is a downwardly extending member 144 formed at its lower end-portion with a hook-shaped part 145, the curved marginal edge-portion 146 of which is adapted to be brought into operative engagement with the laterally bent free end-portion 148 of an arm or lever 147 which is suitably fixed at its lower end, by means of its hub 149 and a screw 150, or in any other suitable manner, upon a rod 151 which is mounted in bearing-members 152, also secured to and extending upwardly from the base-plate 1, said rod 151 having a slight oscillatory movement in the bearing-portions of said members 152. The pivotal or swinging movement of the downwardly extending member 144 is limited by a pin or stud 153 which projects from the side of the arm or lever 129 and extends into an elongated opening 154 with which the said member 144 is provided. Extending from the said member 144 is an arm-like projection or extension, as 155, the free end-portion of which is bent at an angle, as at 156, so as to form a pull-piece, which is normally out of engagement with the fingers or projections 128 of the disk-like member 126, but which immediately passes between two of said fingers or projections 128, as soon as the machine is operated. The normal disengagement of the said pull-piece 156 with the said fingers or projections 128 is caused by the pivotal arrangement of the member 144, which is to one side, vertically, from the vertical plane passing through the central axis of the main rod 124, and the angular arrangement of the arm-like projection 155 is such that its free end-portion which carries the pull-piece 156 is beyond the circular marginal line passing through the outer ends of the fingers or projections 128 of the disk-like member 126. The said pull-piece 156 is forced downwardly into its operative position between two of said fingers or projections 128 and into its frictional holding engagement with one of the said fingers or projections, as soon as the arm or lever 133 moves in its downward direction, the bent portion 142 of the arm-like member 141 which normally rests, without engagement, above a pin or projection 158 upon a spring-controlled dog 157, pivoted by means of a pin, as 159, upon the said arm-like projection or extension 155. As the said arm-like member 141 is moved downwardly, its bent portion 142 is suddenly brought into engagement with the pin or projection portion 158 of the said pivoted dog 157, so as to produce a swinging movement of the said dog upon the pivotal pin 159, against the action of its returning spring 160. This movement of the dog causes its lower marginal edge-portion to act upon a pin or projection 161 with which the said arm-like projection or extension 155 is provided, so that the downwardly extending member 144 will swing slightly in a forward direction upon its pivot 143, at the same time carrying the said pull-piece 156 down between the two fingers or projections 128 of the disk-like member 126 and into frictional holding engagement with the forward one of said fingers or projections, as will be clearly evident from an inspection more particularly of Figs. 8, 9, 23, 24 and 25 of the drawings. The continued downward movement of the arm or lever 133, by means of the connecting link 132, continues to pull upon the arm or lever 129, so that the disk-like member 126 receives the proper rotary movement in its forward direction, the several parts moving from their normal positions indicated in Fig. 8 of the drawings to their operated positions represented in Fig. 9. The said member 126 being secured upon the hub of the indicating disk or wheel 123, as has been hereinabove stated, it will be understood, that the said disk or wheel 123 is correspondingly moved, so as to bring the desired number upon its peripheral surface directly in front of the reading space or opening of the machine. The relative movements of the said disks 123 and 126, and their parts, are limited or controlled by the downward movement of the desired key-lever 8 which has been depressed by the operator. The movements of the several key-levers 8 vary, as will be understood, and the downward movements of said levers 8 are limited by certain elements or members, as 161', which are secured to and which extend downwardly from the said key-levers 8. The said elements or members 161 of the respective key-levers 8 are of different lengths, so that the movements of all the key-levers are different, and that the various slides which are movably disposed upon the posts 104, may be variously moved in downward directions to the desired depths, and whereby, by means of the intermediately disposed disk-operating mechanism is correspondingly controlled, to move the disks 123 only the necessary distance that may be desired. Each element or member 161 is made at its lower end-portion in the form shown in the drawings, the said lower end-portion of each element or member 161 being made with the "depression" portions 162 and 163 for the purposes to be presently more fully set forth.

Suitably secured upon the base-plate 1 of the machine is a plate 164 which is formed with upwardly extending bearing-members 165 and in the bearing-portions of which is mounted a rod 166 as shown more particularly in Fig. 10 of the drawings. Oscillatorily mounted upon said rod 166 is a frame 167, the longitudinally extending side-members of which are formed at their forward end-portions with downwardly extending parts 168, connected by a laterally extending trip-plate or bar 169 with which the portions 162 of the said key-levers 8 are adapted to be brought into engagement. Connected with the opposite end-portions of the side-members of said frame 167 is a laterally extending member 170, provided with a stop 171 and with a rearwardly extending arm, as 172. Extending upwardly from said arm 172 is a member 173, and extending rearwardly and longitudinally of the machine is a long arm or finger 174. The free end-portion of this arm or finger 174 terminates directly beneath the free end-portion of a lever or finger 175 which is secured to the previously mentioned rod or shaft 151. The purpose of this mechanism is two-fold: Firstly, the portion 162 of the downwardly moving element or member 161, as it engages the said trip-plate or bar 169, produces a downward movement of said plate or bar, so as to oscillate the frame 167, and thereby moves the parts designated by the reference-characters 170, 172, 173 and 174 correspondingly in upward directions. The upward movement of the arm or finger 174 against the lever or finger 175, see Figs. 8 and 9, sufficiently oscillates the rod or shaft 151, so that the bent end-portion 177 of a stop-arm or lever 176, which is also secured to said rod or shaft 151, enters a pair of said fingers or projections 128 of the disk-like member 126, so as to immediately stop the rotary movement of said member 126 and of the disk 123, whereby that point of the latter disk, bearing the number which is to be displayed at the reading-opening of the machine, is prevented from being carried past said opening by the momentum of the said disks upon the shaft or rod upon which they are mounted. Secondly, and at the same time, the oscillatory movement of the rod or shaft 151 has correspondingly moved the arm or lever 147 in the proper direction, so that its bent free end-portion 148 is brought forcibly against the curved edge-portion 146 of the hook-shaped member 145 of the downwardly extending swinging member 144, to throw the same slightly from left to right, and thereby forces the pull-piece 156 out of its operative engagement with the fingers or projections 128 of the disk-like member 126. In these relative positions these parts remain as long as the key-lever 8 is held depressed. As soon, however, as the pressure is removed from the depressed key-lever 8, the coiled spring 128 becomes active, and all of the said parts assume their normal initial positions, as indicated in said Fig. 8 of the drawings. To prevent any backward rotary movement of the recording or indicating disk 123 upon said shaft, and also of the two disks or wheel-like members 125 and 126, there is also permanently secured upon the hub of each disk 123, a third disk or wheel-like member, as 178, which is provided in its circumferential edge with a series of depressions or cut-away portions 179, preferably of the semi-circular configurations, as shown more particularly in Fig. 18. Suitably mounted in the bearing-portions of brackets or posts 180 which extend upwardly from the base-plate 1, is a rod or bar 181, and loosely mounted upon said rod or bar 181 are a series of upwardly extending fingers 182, each finger being provided upon its upper end-portion with a roller 183. Suitably formed springs 184 upon said rod or bar 181, and in engagement with said fingers 182 and said base-plate 1, force the said rollers 183 under normal conditions into the said depressions or cut-away portions 179 of the respective disks 178. The action of the said springs 184 is such that they will not interfere with the forward rotary movements of the disks 178, and the disks 123, 125 and 126, the springs permitting the rollers 183 to move from one depression 179 into the next depression, and so on, according to the movements of said disks, but the action of said springs 184 is sufficient, so that any tendency of the disks to move in the opposite direction is overcome by the direct contact of the rollers upon the curved surface-portions bounding said depressions or cut-away parts 179, and, as will be evident from an inspection of Figs. 8 and 9, and owing to the consequent pressure exerted upon the said rollers 183 and fingers 182, all tendency of a backward movement of said disks or wheel-like members is fully overcome.

Figure 4:
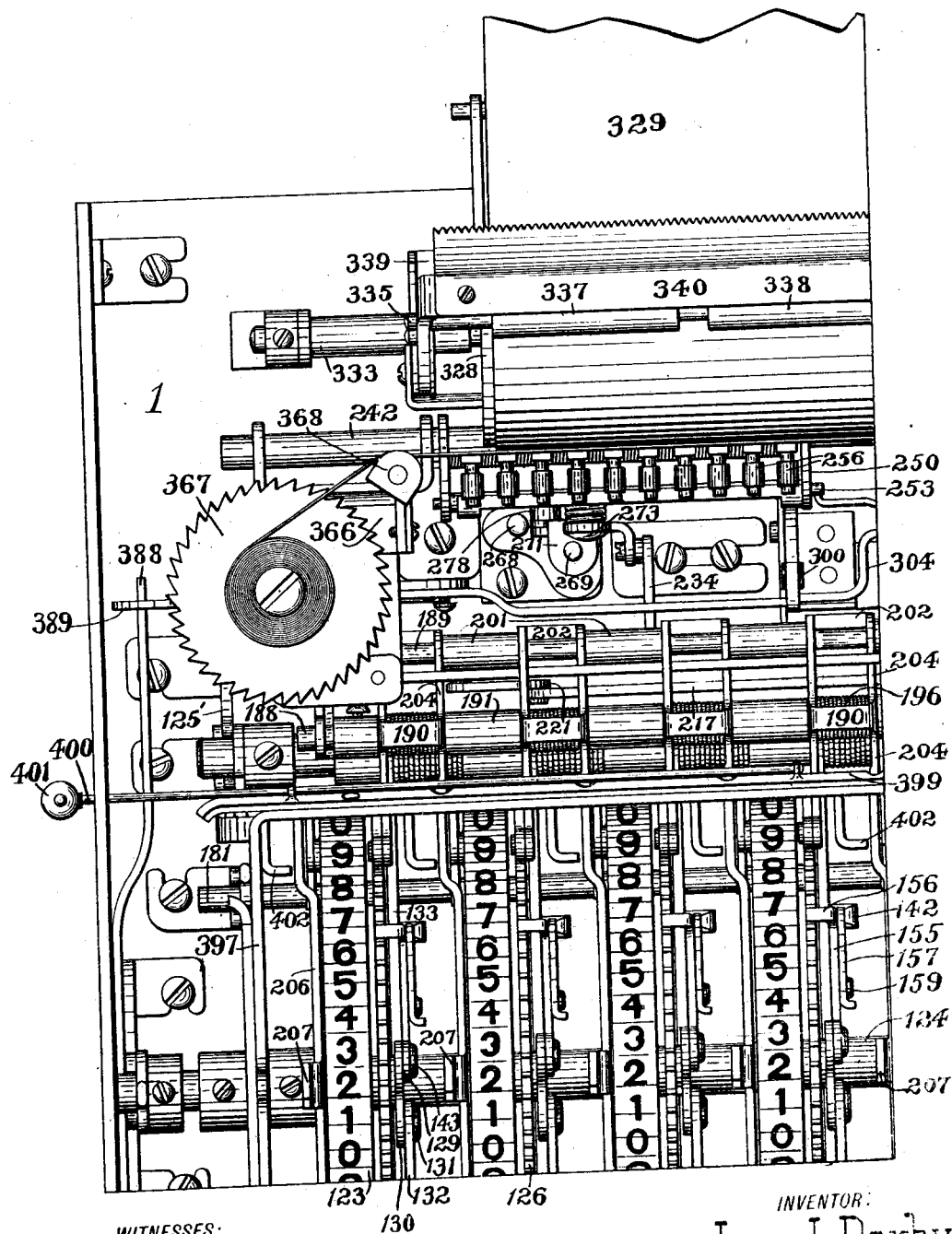
Figure 5:
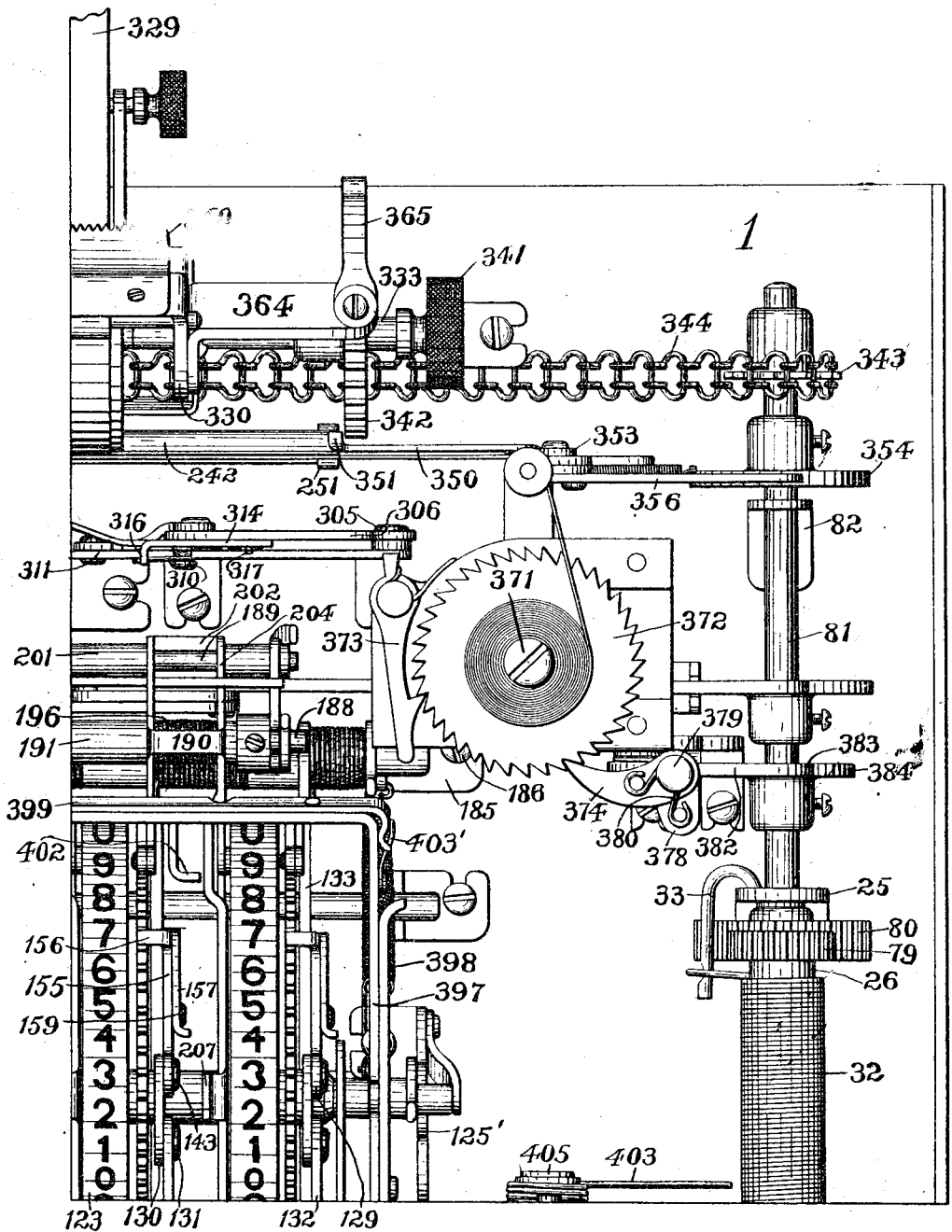

As is well understood, with every adding machine, at various times it is necessary to produce a rotary movement of two, or three, or four, or of all of the recording or indicating disks 123, which are employed for indicating to the operator the aggregate amount or sum total of all the figures which have been printed. The mechanism for producing simultaneously with the rotary movement of a recording or indicated disk 123 by means of the mechanism hereinbefore described, a rotary movement of one or more of the next-higher disks 123, consists essentially of a pair of upwardly extending brackets or posts 185 which are secured upon the base-plate 1 by means of screws 186, or other suitable means, said posts being suitably connected by means of laterally extending rods, as 187, 188 and 189. Oscillatorily arranged upon said rod 188 are a number of suitably formed bearing-like members, as 190, as shown more particularly in Figs. 18, 19 and 20, said members being separated from each other and being suitably spaced apart, upon said rod 188 by means of sleeves 191, as shown in Figs. 4, 5 and 17, and also in said Figs. 18, 19 and 20. Each bearing-like member 190 is provided with a forwardly extending lever-like rocker-arm 192 and with a rearwardly extending stop-arm 193, each stop-arm 193 being formed at its rear end-portion with a cutaway part, as 194, so as to provide a stud-like extension 195.

Connected with each bearing-like member 190 and encircling the rod 188 is a coiled spring 196, each spring 196 having its one end-portion 197 bearing against the shank of a pin 198 which extends from the side of the lever-like rocker-arm 192, and each spring 196, furthermore, having its other end-portion 199 bearing against a rod or bar 200 extending laterally between the said brackets or posts 185. The tendency of these springs 196 is to normally produce a slight rotary movement of each bearing-like member 190 upon said rod 188, so as to force each lever-like rocker-arm 192 in an upward direction and each rearwardly extending stop-arm 193 in a downward direction. Oscillatorily arranged upon the previously mentioned rod 189, and separated by means of sleeves 201 upon said rod 189, are a corresponding number of trip-devices, each device comprising a bearing-like member 202, and each bearing-like member 202 being formed with an upwardly projecting stop-post, as 203, the upper free end of each post normally fitting in the cut-away portion 194 of the stop-arm 193, and having the stud-like extension 195 of said arm 193 bearing directly upon the upper end-portion of said post 203.

Connected with each bearing-like member 202, and extending forwardly and then upwardly, is an arm, as 204, or other suitably formed tripping element, each arm being provided upon its free end-portion with an engaging member 205, with which it is brought into lifting engagement, at the proper time, and as will be evident from an inspection of Fig. 18 of the drawings, the tapering end-member 207 of a trip-arm, as 206, which is mounted upon the hub of the disk 123, and suitably secured thereto, so as to rotate with the disk.

Referring now again to Fig. 8 of the drawings, it will be seen, that each forwardly extending lever-like rocker-arm 192 is provided at its free end-portion with a pivot-pin 208, and pivoted upon each pin 208 is a gravity-dog, as 209, each dog 209 swinging freely upon its pivot-pin 208. Each dog 209 is weighted, as at 210, and has a part 211 which is formed at its lower end-portion with a laterally extending lug or projection, as 212, adapted to be swung into lifting engagement with a tooth 127 of a disk or wheel-like member 125, when the tapering end-member 207 of the arm 206 connected with the hub of the next-lower disk 123 moves into lifting engagement with the engaging member 205 of the arm 204. The swinging movement of the arm 204, thus produced, removes the stop-post 203 from its engagement with the stud-like extension 195 of the stop-arm 193, so as to permit the spring 196 to act and force the lever-like arm 192 in an upward direction, as will be evident. The degree of the upward movement of each arm 192, when operated, is limited by the downward movement of the corresponding stop-arm 193 being brought into engagement with the upper edge-portion of a bar or plate, as 213, which is laterally supported between the brackets or posts 185, having its end-portions slidably mounted in suitably disposed slots, as 214, or other suitable guiding means, with which the said brackets or posts 185 are provided. The limited upward movement of the arm 192 being in the arc of a circle, with its center in the longitudinal axis of the rod 188, it will be evident that the laterally extending lug or projection 212 of the released gravity-dog 209 is moved directly in the path of the ratchet-teeth of the next-higher disk or wheel-like member 126, so that simultaneously, and at the pre-determined time, with rotary movement of the next-lower recording or indicating disk 123, the next-higher recording or indicating disk 123 will also be rotated by the upward movement of the said lug or projection 212 in engagement with the correspondingly located ratchet-tooth of the disk 126, but only the distance of one space of said disk, until the said lug or projection 212 has again passed from its engagement with said ratchet-tooth and out of the path of movement of the next following ratchet-tooth.

In the present construction, as will be seen from an inspection of Fig. 18 of the drawings, each hub of the disks or wheel-like members 123 are provided with an arrangement of four radially extending arms 206, because each disk 123 is peripherally provided with four series of digits, each ranging from 0 to 1 inclusive; but, it will be understood, that with disks 123 provided with a smaller or larger number of such series of digits, the number of said radially extending arms 206 are correspondingly changed.

One means for again returning all of the disengaged stop posts 203 into their engaged relation with the respective stud-like extensions 195 of the stop-arms 193 is illustrated in Fig. 17 of the drawings, and consists, essentially, of a frame 215 suitably mounted upon the base-plate 1, said frame 215 carrying a suitably formed stop 216, and a pair of tilted and upwardly extending arms 217 which are pivoted to said frame 215, as at 218, and are connected by means of a connecting link 219. This link is pivotally attached at its end-portions to the respective arms 217, as at 220. Upon its upper end-portion, each arm 217 carries a roller 221, said rollers being always in supporting and rolling engagement with the lower edge-portion of the previously-mentioned bar or plate 213. Pivotally attached at one end to one of said arms 217, by means of a pin 222, is a pull-rod or bar 223, said rod or bar being provided at its other end with a hook-shaped portion 227, normally resting in a depression or cut-away part 225 formed in the peripheral edge of a disk 224 which is suitably secured upon the previously-mentioned oscillating shaft or spindle 26. At the initial operation of the laterally moving spacing means or carriage, the said shaft or spindle 26 and the disk 224 thereon receive a rotary motion in the direction of the arrow $a$, in said Fig. 17 of the drawings, thereby pulling the pull-rod or bar 223 in the direction of the arrow $b$, thus bringing the rollers 221 into rolling and lifting engagement with the lower edge of the plate or bar 213, thereby producing an upward movement of the said plate or bar 213, so as to move its upper edge-portion against any one or more of the previously lowered stop-arms 193 and thereby raising the same sufficiently to allow the stop-posts 203 to again enter into their engaged relation with the stud-like projections 195 of said stop-arms, as will be clearly evident. As soon as the pulling edge-portion 226 of the disk 224 leaves its engagement with the hook-shaped portion 227 of the rod or bar 223, it will rest in an inoperative engagement upon the circular edge-portion 228 of the disk 224, thus permitting the arms 217 to automatically assume their normal initial positions, indicated in said Fig. 17, one of said arms resting against the stop 216, as shown. Under these conditions both the rollers 221 and the bar or plate 213 are lowered, to the positions represented in said Fig. 8, without effecting any disengagement between the stop-posts 203 and stop-arms 193, until the latter become disengaged in the manner here-before mentioned.

Suitably mounted upon the bed-plate 1 are a pair of bearings 229 which carry a laterally extending rod 230 and upon which rod is mounted a suitably formed rock-frame shown in Fig. 10 of the drawings. The side-members 231 of this frame are connected at the front by a member 232, and at the rear by the portions 233, which are suitably connected, and one portion 233 having extending rearwardly therefrom an actuating lever or arm 234. Suitably mounted upon said rod 230 is a coiled spring 235, having one end-portion 236 thereof resting upon the upper edge-portion of one of said rear portions 233 of said rock-frame, so as to press said portion of the rock-frame, normally, in a downward direction toward the plane of the upper face of the bed-plate 1, and the front member 232 normally in an upward direction from said bed-plate, the opposite end-portion 237 of said spring 235 bearing directly upon the upper face of the said bed-plate 1. The purpose of this rock-frame and its rearwardly extending lever or arm 234 is to produce a lateral movement of a type-carrying carriage from left to right of the apparatus when the rear portion of said rock-frame is raised and its front portion lowered by the downward movement of any one of the digit-indicating key-levers 8, as the depressed key-lever is depressed and in its downward movement bears upon the front-member 232 of the rock-frame and thus also carries the same in a downward direction.

Referring now to Figs. 11 and 12 of the drawings, it will be seen, that there is secured upon the bed-plate 1 by means of screws 238, or other suitable fastening means, an upwardly extending standard or post, as 239, which is provided upon its upper portion with two pairs of rearwardly extending bearing-members, as 240 and 241. Suitably mounted in said bearing-portions or members 240, and suitably secured against lateral displacement, is a laterally extending guide-rod or bar 242; and, suitably mounted in said bearing-portions or members 241, and also secured against lateral displacement is another laterally extending guide-rod or bar 243. Slidably mounted upon the said laterally extending guide-rods or bars 242 and 243 is the hereinabove mentioned type-carrying carriage. This carriage consists, essentially, of a front-plate 244, suitably formed with an elongated opening 245 and a pair of laterally extending members 246, said front plate 244 being provided with a rearwardly extending part 247 formed with bearing-portions 248, and the said members 246 being connected by a rearwardly extending part 249 formed with bearing-portions 250, the said rod 242 and 243 extending through the respective bearing-portions 248 and 250, and one of said rods, as 242, having suitably secured upon its free end-portion a collar 251, or other suitable means, which acts as a stop to limit the lateral sliding movement of the said type-carrying carriage, and to prevent said carriage, when operated, from running off said guide-rods 242 and 243, as will be clearly evident. The said rearwardly extending parts 247 and 249 are provided with other bearing-portions 252 in which is suitably mounted a rod 253. Loosely mounted upon said rod 253, and between the said bearing-portions 252, are a series of ten sleeves or hub-like members 253', each sleeve or hub-like member being provided with an upwardly extending stem or arm 254, carrying upon its upper free end-portion an anvil, as 255, and a type-bearing element 256, said type-bearing elements respectively carrying the types from 0 to 9 inclusive, and corresponding in number to the number of the digit-indicating keys and key-levers 8. The said stems or arms 254 are all capable of slight vibratory movements, but are retained in their normal initial positions, indicated in Figs. 14 and 15 of the drawings, by an arrangement of coiled springs 257 which are mounted upon a laterally extending rod 258, each spring 257 having one end-portion 259 in engagement with the upright arm 254, with which each sleeve or hub-like member 253 is provided, and each spring 257 having its other end-portion 260 bearing upon the back of the parts comprising the main frame-work of said type-carrying carriage, as will be clearly seen from an inspection of said Figs. 14 and 15 of the drawings. The frame-work of the said type-carrying carriage may also be provided with a suitably formed guard, as 261, which is suitably secured upon the laterally extending member 246 of the front plate 240 by means of a screw 262 and pins 263, or in any other suitable manner, a plate-like part 264 which extends laterally in front and in close proximity to the series of upwardly extending stems or arms 254, so as to limit their return movements, after the type-bearing elements 256 of said stems or arms have exerted their sudden printing impact upon a printing ribbon and the strip of paper passing over a roll or platen, subsequently to be described more in detail. Along its lower edge-portion, the laterally extending member 245 of the front-plate 244 of said type-carrying carriage is provided with a series of downwardly projecting teeth, as 265, each tooth being preferably formed with a curved marginal edge-portion, as 266. To produce the laterally sliding movement of the said type-carrying carriage, upon said guide-rods or bars 242 and 243, the required distance from left to right, according to the digit-indicating key-lever 8 which has been depressed, and according to the consequent degree of the downward movement of the front end-portion of the previously-mentioned rock-frame, a plate 267 is secured upon the base-plate 1, said plate 267 being provided with two upwardly extending guide-posts 268 and 269. A peculiarly shaped lifting member or element 270 is slidably mounted upon said guide-posts by means of suitably disposed perforated ears or lugs, as 271. Said lifting member or element 270 is also provided with a part, as 272, with which the rear and free end-portion of the previously-mentioned actuating lever or arm 234 of the said rock-frame is suitably and operatively connected, so that the movement of said end-portion of the lever or arm 234 in an upward direction will cause the said lifting member or element 270 to be raised and will correspondingly slide in an upward direction upon said guide-posts 268 and 269. At the same time, a spring-controlled bell-crank which is pivoted, as at 273, upon a bearing-member 274, also secured upon the base-plate 1, and which bell-crank consists of a long arm 275 having upon its free end-portion a roller 276 operatively arranged in the elongated opening 245 of the front-plate 244 of said type-carrying carriage, and of a short arm 277 having upon its free end-portion a roller 278 operatively arranged in a forked member 279 connected with said member or element 270, will produce the said laterally sliding movement of the said type-carrying carriage the required distance from left to right, as will be clearly evident.

During the downward movement of the front end-portion of the previously-mentioned rock-frame and the laterally sliding movement of the type-carrying carriage, the side-members 231 of the previously-mentioned rock-frame are brought down upon a plate-like element or bar 280 which is secured to the free end-portions of the side-arms 281 of a yoke-shaped member 282. This member 282 and its side-arms 281 are adapted to rock upon a rod 283 which is mounted in suitable bearing-portions 284 extending upwardly from the base-plate 1. The normally raised position of said plate-like element or bar 280 is produced by means of a coiled spring 285, said spring having its one end-portion 286 bearing upon the rear member of said yoke-shaped element 282, and the other end-portion 287 of said spring bearing upon the base-plate 1. Extending rearwardly from the said yoke-shaped element is a lever or arm 288, the free end-portion of said lever or arm being made, as at 298, see Figs. 14, 15 and 16 of the drawings, and said end 289 being provided with a pivot-pin 290. Pivotally arranged upon said pin 290 is an upwardly projecting pawl or dog 291, upon the outer edge-portion of which bears the one end-portion of a suitably formed spring, as 292, the said spring being suitably coiled about a part of the said pin 290 which extends from the side of the pawl or dog 291, and the other end-portion of said spring extending beneath and being in engagement with the lower edge-portion of the said lever or arm 288. The reference-character 293 indicates a post which is suitably secured upon the base-plate 1, said post 293 having pivotally connected therewith, as at 294, the lower end-portion of an upwardly extending hammer-arm 295 said arm being provided with an extension, as 296, which is formed with a tooth-like projection 297 and an angularly formed sharp marginal edge-portion 298. Attached to the said hammer-arm 295 is the one end of a coiled spring 299 and upon its upper end-portion, the said hammer-arm is provided with a striking member or element, as 300. The operation of the hammer-arm is timed in such a manner, so that its striking member or element will strike the proper anvil 255, hereinbefore mentioned, immediately after the type-carrying carriage has been laterally moved into the desired position ready for printing, and the operation of the said hammer-arm is produced as follows:

As the arm or lever 288 is raised, the free end-portion or nosing of the said pawl or dog 291, being in engagement with the tooth-like projection 297 of the extension 296 of the hammer-arm, causes said arm to swing upon its pivot in the direction of the arrow, as indicated in Fig. 15 of the drawings. The previously mentioned spring 299, which has its opposite end-portion attached to a post, as 301, extending upwardly from the base-plate 1, thus becomes distended, until the hammer-arm is moved into the position represented in said Fig. 15, at which time the angularly formed sharp marginal edge-portion 298 of the extension 296 engages the said dog or pawl 291 and forces its free end-portion or nosing from further operative engagement with said tooth-like projection 297. Immediately the action of the coiled spring 299 comes into play, and the hammer-arm rapidly and forcibly tends to return to its normal position, illustrated in Fig. 14 of the drawing, and for an instant its striking member or element 300 strikes the anvil 255, which has been moved into position, and causes the type-bearing element 256 to be forced against the ink-ribbon or tape and do the printing, as will presently appear. During the return-movement of the hammer-arm to its normal initial position sufficient time elapses to allow the spring 292 which bears against the pawl or dog 291 to again bring the free end-portion or nosing of the said pawl or dog into its operative engagement with the said tooth-like projection 297, whereby these parts are once more in position for the next operation. To prevent the said type-carrying carriage from moving from left to right past the point at which it is desired that the said carriage shall stop, due to the momentum, there is secured upon the base-plate 1 a suitably formed standard or post, as 302, to which is pivoted, as at 303, a laterally extending arm or lever 304, the free end-portion 305 of which rests upon the upper edge of the rearwardly extending arm or lever 288, whereby the said arm or lever 288 as it is raised will also raise the said laterally extending arm or lever 304.

Pivotally connected with the upper end-portion of the said standard or post 302, upon a pivot-pin 305', is a short laterally extending arm 306, said arms 304 and 306 being suitably connected by means of a link 307 having its respective end-portions pivotally connected with the said respective arms 304 and 306 by means of the pivot-pins 308 and 309. At its free end, the said arm 306 has pivotally connected therewith, by means of a pivot-pin 310, a stop-arm 311, said arm being provided at its one end-portion with an angularly bent part, as 312, which, as the arm 306 is raised, is made to enter the space between any two of the previously-mentioned teeth 265, according to the movement from left to right of the type-carrying carriage. As shown, the said stop-arm 311 is retained in a normally horizontal position by means of a coiled spring 313, the coils of which are mounted upon the shank of the pivot-pin 310, said arm 311 being also provided with oppositely projecting fingers or extensions, as 314 and 315, the finger 314 having a right-angled projection 316 upon its free end, with which the one free-end-portion of the spring 313 is in engagement, for normally forcing the other finger or extension 315 down upon a stop, as 317, extending from the side of the said arm 306, and with which stop the other free end-portion of said spring 313 is in engagement. The purpose of this pivotal arrangement of the stop-arm 311 is to allow for a slight movement of the said arm upon its means of pivotal support, so that in entering between any two adjacent teeth 265 of the type-carrying carriage, there will be sufficient give to these parts of the mechanism at the angularly bent part 312 of the stop-arm 311, and will readily slide upon the curved edge-portion of a tooth 265 and will finally land in its positively holding relation between two teeth, at the base or root of said teeth, as will be clearly understood. To again withdraw the bent end-portion 312 of the stop-arm 311 from its holding or retaining relation between and with any two of said teeth 265, when the rear end-portion of the rearwardly extending arm or lever 288 is again lowered, the link 307 hereinabove mentioned has suitably attached thereto the one end-portion of a coiled spring 318, said spring being suitably secured at its other end-portion to the said standard or post 302.

At the back end of the apparatus, and suitably secured upon the base-plate 1, are a pair of standards or posts 319 and 320, said posts being provided at their upper ends with suitable receiving portions in which is suitably mounted a laterally extending guide-rod 321. Slidably mounted upon this guide-rod 321 and upon a track or rail 322, extending laterally between the said standards 319 and 320 and suitably secured upon the base-plate 1, is a paper-roll and platen-carrying carriage. This carriage comprises a pair of side-members 323 which are provided at their lower end-portions with pivot-pins 324, upon each of which is mounted a grooved wheel or roller, as 325, resting and movably arranged upon the said track or rail 322. Extending rearwardly from each side-member 323, are bracket-like members, as 326, having suitable bearing-portions for the reception and for rotatably mounting therein a spindle 327, carrying a suitable roller 328 upon which is adapted to be arranged and rolled thereon a strip or roll of paper 329, upon which the numbers are to be printed and arranged in a column. Suitably connected with the upper end-portions of said side-members 323 are other side-members, as 330, each side-member 330 being formed with a bearing-portion, as 331, slidably mounted upon the previously-mentioned guide-rod 321. The said side-members 330 are connected at their upper end-portions by means of a laterally extending member or bar 332 to give stability to the frame-work thus produced. Rotatably arranged in suitably disposed bearing-portions in said side-members 330 are spindles 333, 334 and 335, the spindle 333 having secured thereon a cylindrical platen 336, and the spindles 334 and 335 being provided with the respective and suitably formed feed-rollers 337 and 338. The reference-character 339 indicates a suitably constructed paper-guiding means or device which is mounted upon the said side-members 330, and serve to properly feed the strip of paper from the roll of paper 329 over said guiding means 339 and between the said feed-rollers 337 and 338 and the platen 336, and around a portion of the said platen as cylindrical surface of the said platen as will be clearly understood. The laterally extending member or bar 332 may also be made with a downwardly extending and angular part, as 340, the marginal edge-portion of which serves as a means for ripping or tearing away that portion of the strip of paper upon which the column of figures has been printed.

The rotary motion of the spindle 333 may be produced by hand, by means of a suitable fingerpiece or knob 341 which is suitably secured upon the end of said spindle; or, the intermittent rotary movement of said spindle 333 may also be automatically produced by means of a toothed wheel which is suitably secured upon said spindle 333, and is intermittently actuated at the initial movement of the said paper-roll and platen-carrying carriage from left to right of the apparatus. To produce the movement of the said carriage, when a key lever of the apparatus is depressed, there is mounted upon the spindle or shaft 81 a toothed or sprocket-wheel 343, over which passes a link-chain 344, or other suitable flexible element, said chain passing over another tube or sprocket-wheel 345, which runs loosely upon a pin 346 carried by a post or bracket 347.

Connected with one of the said side-members 323 of the said paper-roll or platen-carrying carriage is a bracket, as 348, which is provided with a forwardly extending arm 349 and a pin or stud 350, said pin or stud extending into one of the links of said chain 344, so that the movement of the said chain, in either direction, will produce a corresponding movement in the right direction, to bring a strip of paper which is placed over the platen, into its proper position for the proper printing thereof of the number or figure desired immediately upon the starting movement of the said paper-roll and platen-carrying carriage from left to right of the apparatus, the said toothed wheel 342, which is preferably in the form of a ratchet-wheel, moves directly over the end-portion 351 of a rock-arm as 350, which is pivotally mounted by means of a pin 352 upon a standard or post 353. Upon the said shaft or spindle 81 is a disk-like member 354, see Fig. 21, which is formed with an off-set 355, and in engagement with this offset 355 is the hook-shaped end 357 of a link 356. At its opposite end, as at 358, this link is pivotally connected with an oscillatory arm 359 which is adapted to oscillate upon a pin 360 extending from the face of the said standard or post 353. At its other end-portion the said oscillatory arm 359 has an elongated opening or slot, as 361, through which extends the shank of a pin 362, and by means of which the said oscillatory arm 359 is operatively and slidably connected with a rock-arm 350, as will be clearly evident. Between the said standard or post 353 and the link 356 is a coiled spring 363, the tendency of which is to at all times pull the hook-shaped end 357 of the link 356 down upon the peripheral surface-portions of the said disk-like member 354. Thus, it will be evident, that when the said shaft or spindle 81 is revolved in a direction from left to right at the depression of a key-lever, the off-set 355 of the disk-like member 354 is moved against the hook-shaped end-portion 357 of the link 356, whereby the oscillatory arm 359 and the rock-arm 350 are actuated in such a manner, so as to slightly raise the end-portion 351 of the rock-arm 350 directly in alinement with the marginal or toothed-edge-portion of the wheel 342. The paper-roll and platen-carrying carriage moving, simultaneously with the action of said members 356, 359 and 350, from left to right of the apparatus, the said end-portion 351, in its upward-movement, engages a tooth of the said wheel 342, whereby the said wheel and shaft 333 are rotated the distance between two teeth, and the intermittent rotary movement of the platen produced by the consequent rotary movement of the spindle or shaft 333 feeds the paper into its proper position for the printing thereon. To prevent any backward rotation of the said toothed wheel 342, and of the shaft or spindle 33 and its platen, an arm, as 364, extends from the side of the paper-roll and platen-carrying carriage, said arm being provided with a suitably formed spring-pawl 365 which is in engagement with the teeth of the said wheel 342, and acts in the usual and well-known manner.

Suitably mounted upon the previously-mentioned standard or post 239 is a bracket-like element, as 366, which carries a suitable ribbon-holder 367, and a ribbon-guide 368. Extending from the base-plate 1 is another post or standard, as 369, the upper part of which has a supporting portion 370, upon which is rotatably mounted a ribbon-holder or spool 371, provided with a ratchet-disk 372, and the usual detent 373, and a pivoted dog or pawl 374, for producing intermittently a rotary movement of the spool 371, and for unwinding the printing ribbon from the holder or spool 367 and upon the holder or spool 371. To move the said dog or pawl 374 into its operative engagement with the teeth of the ratchet-disk 372, there is pivoted upon the side of the post or standard 369, as at 375, an oscillatory arm 376 which is under the control of a spring, as 377. Upon its upper end-portion, the said arm 376 is made with a supporting or shelf-like portion 378 upon which the said dog or pawl 374 is pivoted, as at 379, and is under the tension of a spring 380 for normally forcing the end-portion or nosing of the said dog or pawl 374 into its operative engagement with the serrations or teeth of the said ratchet-disk 372. Pivotally connected with the lower end-portion of the arm 376, as at 381, is a link 382. The said link is formed with a hook-shaped end-portion 383 which is normally in engagement with an offset 385 of a disk-like member 384 suitably mounted and secured upon the shaft or spindle 81. The rotary action of the said shaft or spindle 81 and of the said disk-like member 384 actuates the said link 382, which in turn pulls upon the lower end-portion of the arm 376, and thus causes the upper end-portion of said arm 376 to forcibly push the nosing of the dog or pawl 374 into its operative engagement with a tooth of the ratchet-disk 372, so as to move the same the distance between two of its adjacent teeth, as will be clearly understood and as will be clearly evident from an inspection of Figs. 11, 12 and 26 of the drawings.

If desired, the indicating and recording wheels or disks of the apparatus can be operated without printing upon the strip of paper. This is accomplished, as will be seen from Figs. 2, 4 and 13, by a rearwardly extending lever 386 which is provided with a suitable finger-piece, as 387, under control of the operator, said lever 386 being pivotally secured at the one side of the apparatus. The rear end-portion 388 of said lever 386 is in lifting engagement with the one end-portion 390 of a laterally extending lever or arm 389, said arm being pivotally secured, as at 391, to a post 392, and being under the control of a suitable spring 393 for holding the lever or arm 386 in its normal initial position represented in Figs. 13, 14 and 15 of the drawings, the opposite end-portion 394 of the said arm 389 terminating slightly above a projection or nosing 396 of a plate 395 which is suitably secured to the previously mentioned hammer-arm 295. When the said laterally extending lever or arm 389 is in its normal position, indicated in said Figs. 13, 14 and 15, the striking movements of the said hammer-arm are not interfered with, as will be clearly evident from an inspection of said figures of the drawings. When, however, the forward end-portion of the rearwardly extending lever 386 is depressed, its rearwardly raised end-portion will raise the end-portion 390 of the lever or arm 389, whereby the other end-portion 394 of said lever of arm 389 is correspondingly lowered and brought directly upon the projection or nosing 396. This engagement of the said end-portion 394 of the lever or arm 389 with said nosing 396 brings the hammer-arm 295 into the position indicated in Fig. 16 of the drawings, so that the said hammer-arm remains in an inoperative position, while the remaining parts of the apparatus can still be operated, until such time when the depressing pressure is released from the fingerpiece 387 of said lever or arm 386, it will be evident from an inspection of said Fig. 16, that the action of the pawl or dog 291 in that case has no effect upon the tooth-like projection 297 of the extension 296 secured to said hammer-arm 295.

If at any time it is desired to return all of the operated indicating or recording disks or wheels to their normal starting positions, so that each disk or wheel will expose to view the zero-digit, there is loosely mounted upon the shaft or spindle which carries the said disks or wheels, a yoke-shaped frame 397, said frame being returned to its normal initial position by a coiled spring 398. Slidably connected with the laterally disposed portion of said yoke-shaped frame 397 is a slide-plate 399, to which is attached a push-rod or bar 400 which is provided with a suitably formed knob or fingerpiece 401. Connected with the said slide-plate 399 are L-shaped fingers 402, the free end-portions of which are adapted to be moved in the path of movement of the previously-mentioned tapering end-members 207 of the arm 206, when the knob or fingerpiece is pushed in a direction so as to move the slide-plate 399 slightly from left to right of the apparatus. Now, by rotating the said yoke-shaped frame 397 toward the forward end-portion of the apparatus, the respective fingers 402 will engage with the respective end-members 207 which happen to be in their paths of movements, so that the corresponding indicating disks or wheels will also be rotated, and the proper distances to bring their respective zero-digits laterally in alinement. The spring 398, as has been stated, when the operator releases the knob or finger-piece 401, returns the yoke-shaped frame again to its normal initial position, while a spring 403' which is secured to said yoke-shaped frame 397 and engages with the end of said slide-plate, automatically returns said slide-plate from right to left of the apparatus, and its fingers 402 to their normal initial an inoperative relation with the respective end-members 207 of the arms 206.

From the foregoing description of the present invention it will be clearly evident that an operative and efficient apparatus for adding purposes has been produced in which the number of the parts has been greatly reduced, and the operations of the various devices and parts which act either singly or in conjunction with one another will be readily understood by those skilled in the art.

Of course it will be clearly evident, that changes may be made in the general arrangements and combinations of the various devices and parts, as well as in the details of the construction of the same, without departing from the scope of the present invention as set forth in the foregoing specification, and as defined in the claims which are appended to the said specification. Hence, I do not limit my present invention to the exact arrangements and combinations of the various devices and the parts thereof as described in the foregoing specification, nor do I confine myself to the exact details of the construction of the said parts, as illustrated in the accompanying drawings.

I claim:

1. The combination, in an adding machine, with a series of rotatably arranged recording or indicating disks, of a releasing or setting carriage, and means normally locking the said disks against movement but adapted to be brought into released relation by the movement of the said releasing or setting carriage, a series of depressible key-levers for actuating the said spacing mechanism, and a second series of depressible key-levers for producing a rotary movement of the released recording or indicating disk.

2. The combination, in an adding machine, with a series of independent and rotatably arranged recording or indicating disks, of a releasing or setting carriage, means coöperating separately with each recording or indicating for normally holding each disk against movement, means for moving the said releasing or setting carriage laterally in front of any one of the said disks and releasing the locking mechanism of said disk, means for producing a rotary movement of the said released disk, and means for producing an intermittent or step by step return movement of the releasing or setting carriage to its normal initial position, and said spacing mechanism with each step by step return movement of the said releasing or setting carriage releasing the locking mechanism of the next succeeding recording or indicating disk.

3. The combination, in an adding machine, with a series of independent and rotatably arranged recording or indicating disks, of a releasing or setting carriage, means coöperating separately with each recording or indicating for normally holding each disk against movement, means for moving the said releasing or setting carriage laterally in front of any one of the said disks and releasing the locking mechanism of said disk, a series of depressible key-levers for actuating said means by means of which said releasing or setting carriage is moved laterally in one direction, and a second series of depressible key-levers for actuating the released means by means of which the rotary movement of the released recording or indicating means is produced.

4. The combination, in an adding machine, with a series of independent and rotatably arranged recording or indicating disks, of a releasing or setting carriage, means coöperating separately with each recording or indicating for normally holding each disk against movement, means for moving the said releasing and setting carriage laterally in front of any one of the said disks and releasing the locking mechanism of said disk, a series of depressible key-levers for actuating said means by means of which said releasing and setting carriage is moved laterally in one direction, and a second series of depressible key-levers for actuating the released means by means of which the rotary movement of the released recording or indicating means is produced.

5. The combination, in an adding machine, with a series of rotatably arranged recording or indicating disks, of a releasing or setting carriage, and means normally locking the said disks against movement but adapted to be brought into released relation by the movement of the said releasing or setting carriage, a series of depressible key-levers for actuating the said releasing or setting carriage, and a second series of depressible key-levers for producing a rotary movement of the released recording or indicating disk, and means coöperating with each set of key-levers for variously and independently limiting the downward movement of each key-lever.

6. The combination, in an adding machine, with a series of independent and rotatably arranged recording or indicating disks, of a releasing or setting carriage, means coöperating separately with each recording or indicating for normally holding each disk against movement, means for moving the said releasing or setting carriage laterally in front of any one of the said disks and releasing the locking mechanism of said disk, a series of depressible key-levers for actuating said means by means of which said releasing or setting carriage is moved laterally in one direction, and a second series of depressible key-levers for actuating the released means by means of which the rotary movement of the released recording or indicating means is produced, and means coöperating with each set of key-levers for variously and independently limiting the downward movement of each key-lever.

7. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, and means for rotating said shaft and thereby actuating said chain so as to move said carriage.

8. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, and a set of depressible key-levers for actuating the said shaft and the carriage operating chain.

9. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, a set of depressible key-levers for actuating the said shaft and the carriage-operating chain, and means coöperating with said set of key-levers for variously and independently limiting the downward movement of each key-lever.

10. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, a set of depressible key-levers for actuating the said shaft and the carriage-operating chain, and means coöperating with said set of key-levers for variously and independently limiting the downward movement of each key-lever, consisting of a pivotally mounted plate, said plate being provided with extensions of various lengths and slots of various depths, said extensions and slots corresponding to the respective key-levers.

11. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, a set of depressible key-levers for actuating the said shaft and the carriage-operating chain, and means coöperating with said set of key-levers for variously and independently limiting the downward movement of each key-lever, consisting of a pivotally mounted plate, said plate being provided with extensions of various lengths and slots of various depths, said extensions and slots corresponding to the respective key-levers, and locking means connected with said pivotally mounted plate and the said chain wheel for arresting the momentum of said wheel and the said carriage.

12. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, a set of depressible key-levers for actuating the said shaft and the carriage-operating chain, and means coöperating with said set of key-levers for variously and independently limiting the downward movement of each key-lever, consisting of a pivotally mounted plate, said plate being provided with extensions of various lengths and slots of various depths, said extensions and slots corresponding to the respective key-levers, and locking means connected with said pivotally mounted plate and the said chain-wheel for arresting the momentum of said wheel and the said carriage, a stop-arm extending from said pivotally mounted plate, and a series of properly mounted lugs upon said wheel which serve as stops, and with which the said stop-arm is adapted to be brought into engagement for arresting the momentum of said wheel and the carriage.

13. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, and means for rotating said shaft and thereby actuating said chain so as to move said carriage, consisting of a post, a carrier-plate provided with perforated ears slidably arranged upon said post, a short spindle, sprocket-wheels mounted respectively upon said spindle and said shaft, a link-chain arranged over said sprocket-wheels, a finger extending from said carrier-plate, said finger having a portion in engagement with said last-mentioned link-chain, and means adapted to be brought into engagement with said finger, so as to actuate said carrier-plate.

14. The combination, in an adding machine, with a series of rotatably arranged recording or indicating disks, of a laterally moving releasing or setting carriage, means normally holding the said disks against movement, but adapted to be brought into released relation by the movement of the said carriage, means for producing the lateral movement of said carriage comprising a rotary shaft, a chain-wheel on said shaft, a link-chain running over said chain-wheel, said chain being connected with said carriage, and means for rotating said shaft and thereby actuating said chain so as to move said carriage, consisting of a post, a carrier-plate provided with perforated ears slidably arranged upon said post, a short spindle, sprocket-wheels mounted respectively upon said spindle and said shaft, a link-chain arranged over said sprocket-wheels, a finger extending from said carrier-plate, said finger having a portion in engagement with said last-mentioned link-chain, and a set of depressible key-levers adapted to be brought into engagement with said finger, so as to actuate said carrier-plate.

15. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, and means for rotating said shaft and thereby actuating said chain so as to move said carriage, consisting of a post, a carrier-plate provided with perforated ears slidably arranged upon said post, a short spindle, sprocket-wheels mounted respectively upon said spindle and said shaft, a link-chain arranged over said sprocket-wheels, a finger extending from said carrier-plate, said finger having a portion in engagement with said last-mentioned link-chain, a set of depressible key-levers adapted to be brought into engagement with said finger, so as to actuate said carrier-plate, and means coöperating with said set of key-levers for variously and independently limiting the downward movement of each key-lever.

16. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, and means for rotating said shaft and thereby actuating said chain so as to move said carriage, consisting of a post, a carrier-plate provided with perforated ears slidably arranged upon said post, a short spindle, sprocket-wheels mounted respectively upon said spindle and said shaft, a link-chain arranged over said sprocket-wheels, a finger extending from said carrier-plate, said finger having a portion in engagement with said last-mentioned link-chain, a set of depressible key-levers adapted to be brought into engagement with said finger, so as to actuate said carrier-plate, and means coöperating with said set of key-levers for variously and independently limiting the downward movement of each key-lever, consisting of a pivotally mounted plate, said plate being provided with extensions of various lengths and slots of various depths, said extensions and slots corresponding to the respective key-levers.

17. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, and means for rotating said shaft and thereby actuating said chain so as to move said carriage, consisting of a post, a carrier-plate provided with perforated ears slidably arranged upon said post, a short spindle, sprocket-wheels mounted respectively upon said spindle and said shaft, a link-chain arranged over said sprocket-wheels, a finger extending from said carrier-plate, said finger having a portion in engagement with said last-mentioned link-chain, a set of depressible key-levers adapted to be brought into engagement with said finger, so as to actuate said carrier-plate, and means coöperating with said set of key-levers for variously and independently limiting the downward movement of each key-lever, consisting of a pivotally mounted plate, said plate being provided with extensions of various lengths and slots of various depths, said extensions and slots corresponding to the respective key-levers, and locking means connected with said pivotally mounted plate and the said chain-wheel for arresting the momentum of said wheel and the said carriage.

18. The combination, in an adding machine, with a series of rotatably arranged recording or indicating disks, of a laterally moving releasing or setting carriage, means normally holding the said disks against movement but adapted to be brought into released relation by the movement of the said carriage, means for producing the lateral movement of said carriage comprising a rotary shaft, a chain-wheel on said shaft, a link-chain running over said chain-wheel, said chain being connected with said carriage, and means for rotating said shaft and thereby actuating said chain so as to move said carriage, consisting of a post, a carrier-plate provided with perforated ears slidably arranged upon said post, a short spindle sprocket-wheel mounted respectively upon said spindle and said shaft, a link-chain arranged over said sprocket-wheels, a fingers extending from said carrier-plate, said finger having a portion in engagement with said last-mentioned link-chain, a set of depressible key-levers adapted to be brought into engagement with said finger, so as to actuate said carrier-plate, and means co-operating with said set of key-levers for variously and independently limiting the downward movement of each key-lever, consisting of a pivotally mounted plate, said plate being provided with extensions of various lengths and slots of various depths, said extensions and slots corresponding to the respective key-levers, a stop-arm extending from said pivotally mounted plate, and a series of properly placed lugs up on said wheel which serve as stops and with which the said stop-arm is adapted to be brought into engagement for arresting the momentum of said wheel and the carriage.

19. The combination, in an adding machine, with a series of rotatably arranged recording or indicating disks, and means normally holding said disks against movement, of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, and means for producing a downward movement of the released slide upon its post, so as to cause said slide to actuate the said disk-holding means.

20. The combination, in an adding machine, with a series of rotatably arranged recording or indicating disks, and means normally holding said disks against movement, of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means.

21. The combination, in an adding machine, with a series of rotatably arranged recording or indicating disks, and means normally holding said disks against movement of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means.

22. The combination, in an adding machine, with a series of rotatably arranged recording or indicating disks, and means normally holding said disks against movement, of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, and a spring-actuated means for producing a downward movement of the released slide upon its post, so as to cause said slide to actuate the said disk-holding means.

23. The combination, in an adding machine, with a series of rotatably arranged recording or indicating disks, and means normally holding said disks against movement, of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means, and a spring connected with said rock-frame for returning it to its normal initial position.

24. The combination, in an adding machine, with a series of rotatably arranged recording or indicating disks, and means normally holding said disks against movement, of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, a series of depressible key-levers, a rock-frame adapted to be actuated by means of any one of said key-levers, an actuating plate slidably mounted upon said work-frame, and a series of rearwardly extending fingers connected with said plate, all arranged so that the corresponding finger will engage the released slide and produce a downward movement of the said slide upon its post, so as to cause said slide to actuate the said disk-holding means, and a spring connected with said rock-frame for returning it to its normal initial position.

25. The combination, in an adding machine, with a series of rotatably arranged recording or indicating disks, and means normally holding said disks against movement, of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, and means for producing a downward movement of the released slide upon its post, so as to cause said slide to actuate the said disk-holding means, and means connected with the said disk-holding means and co-operating therewith for returning the said disk-holding means and the actuated slide to their normal initial positions.

26. The combination, in an adding machine, with a series of rotatably arranged recording or indicating disks, and means normally holding said disks against movement, of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means, and means connected with the said disk-holding means and co-operating therewith for returning the said disk-holding means and the actuated slide to their normal initial positions.

27. The combination, in an adding machine, with a series of rotatably arranged recording or indicating disks, and means normally holding said disks against movement, of a series of outwardly disposed posts a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means, and means connected with the said disk-holding means and coöperating therewith for returning the said disk-holding means and the actuated slide to their normal initial positions.

28. The combination, in an adding machine, with a series of rotatably arranged recording or indicating disks, and means normally holding said disks against movement, of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, and a spring-actuated means for producing a downward movement of the released slide upon its post, so as to cause said slide to actuate the said disk-holding means, and means connected with the said disk-holding means and coöperating therewith for returning the said disk-holding means and the actuated slide to their normal initial positions.

29. The combination, in an adding machine, with a series of rotatably arranged recording or indicating disks, and means normally holding said disks against movement, of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means, and a spring connected with said rock-frame for returning it to its normal initial position, and means connected with the said disk-holding means and coöperating therewith for returning the said disk-holding means and the actuated slide to their normal initial positions.

30. The combination, in an adding machine, with a series of rotatably arranged recording or indicating disks, and means normally holding said disks against movement, of a series of vertically disposed posts, a slide movably disposed upon each post, each slide being normally immovably held upon the post upon which it is mounted, means adapted to be brought into engagement with a slide for bringing said slide into its released relation for vertical movement upon its post, and simultaneously into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means, and a spring connected with said rock-frame for returning it to its normal initial position, and means connected with the said disk-holding means and coöperating therewith for returning the said disk-holding means and the actuated slide to their normal initial positions.

31. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, and means for producing a downward movement of the released slide upon its post, so as to cause said slide to actuate the said disk-holding means.

32. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means.

33. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means.

34. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with a slide for producing such rotary motion of the slides so as to disengage the slides from their retained engagement with said second-mentioned posts, and simultaneously bring the released slide into relative position ready to actuate the said recording or indicating disk-holding means, and a spring-actuated means for producing a downward movement of the released slide upon its post, so as to cause said slide to actuate the said disk-holding means.

35. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means, and a spring connected with said rock-frame for returning it to its normal initial position.

36. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means, and a spring connected with said rock-frame for returning it to its normal initial position.

37. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, and means for producing a downward movement of the released slide upon its post, so as to cause said slide to actuate the said disk-holding means, and means connected with the said disk-holding means and coöperating therewith for returning the said disk-holding means and the actuated slide to their normal initial positions.

38. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means, and means connected with the said disk-holding means and coöperating therewith for returning the said disk-holding means and the actuated slide to their normal initial positions.

39. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means, and means connected with the said disk-holding means and coöperating therewith for returning the said disk-holding means and the actuated slide to their normal initial positions.

40. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with a slide for producing such rotary motion of the slides so as to disengage the slides from their retained engagement with said second-mentioned posts, and simultaneously bring the released slide into relative position ready to actuate the said recording or indicating disk-holding means, and a spring-actuated means for producing a downward movement of the released slide upon its post, so as to cause said slide to actuate the said disk-holding means, and means connected with the said disk-holding means and coöperating therewith for returning the said disk-holding means and the actuated slide to their normal initial positions 41. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means, and a spring connected with said rock-frame for returning it to its normal position, and means connected with the said disk-holding means and coöperating therewith for returning the said disk-holding means and the actuated slide to their normal initial positions.

42. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means, and a spring connected with said rock-frame for returning it to its normal initial position, and means connected with the said disk-holding means and coöperating therewith for returning the said disk-holding means and the actuated slide to their normal initial positions.

43. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, and means for producing a downward movement of the released slide upon its post, so as to cause said slide to actuate the said disk-holding means, and a spring connected with each one of said series of second-mentioned posts, each spring being in engagement with a slide for rotating the actuated slide into its normal retaining engagement with the corresponding one of the series of said second-mentioned posts.

44. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means, and a spring connected with each one of said series of second-mentioned posts, each spring being in engagement with a slide for rotating the actuated slide into its normal retaining engagement with the corresponding one of the series of said second-mentioned posts.

45. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means, and a spring connected with each one of said series of second-mentioned posts, each spring being in engagement with a slide for rotating the actuated slide into its normal retaining engagement with the corresponding one of the series of said second-mentioned posts.

46. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with a slide for producing such rotary motion of the slides so as to disengage the slides from their retained engagement with said second-mentioned posts, and simultaneously bring the released slide into relative position ready to actuate the said recording or indicating disk-holding means, and a spring-actuated means for producing a downward movement of the released slide upon its post, so as to cause said slide to actuate the said disk-holding means, and a spring connected with each one of said series of second-mentioned posts, each spring being in engagement with a slide for rotating the actuated slide into its normal retaining engagement with the corresponding one of the series of said second-mentioned posts.

47. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means, and a spring connected with said rock-frame for returning it to its normal initial position, and a spring connected with each one of said series of second-mentioned posts, each spring being in engagement with a slide for rotating the actuated slide into its normal retaining engagement with the corresponding one of the series of said second-mentioned posts.

48. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means, and a spring connected with said rock-frame for returning it to its normal initial position, and a spring connected with each one of said series of second-mentioned posts, each spring being in engagement with a slide for rotating the actuated slide into its normal retaining engagement with the corresponding one of the series of said second-mentioned posts.

49. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, and means for producing a downward movement of the released slide upon its post, so as to cause said slide to actuate the said disk-holding means, and means connected with the said disk-holding means and coöperating therewith for returning the said disk-holding means and the actuated slide to their normal initial positions, and a spring connected with each one of said series of second-mentioned posts, each spring being in engagement with a slide for rotating the actuated slide into its normal retaining engagement with the corresponding one of the series of said second-mentioned posts.

50. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means, and means connected with the said disk-holding means and coöperating therewith for returning the said disk-holding means and the actuated slide to their normal initial positions, and a spring connected with each one of said series of second-mentioned posts, each spring being in engagement with a slide for rotating the actuated slide into its normal retaining engagement with the corresponding one of the series of said second-mentioned posts.

51. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means, and means connected with the said disk-holding means and coöperating therewith for returning the said disk-holding means and the actuated slide to their normal initial positions, and a spring connected with each one of said series of second-mentioned posts, each spring being in engagement with a slide for rotating the actuated slide into its normal retaining engagement with the corresponding one of the series of said second-mentioned posts.

52. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with a slide for producing such rotary motion of the slides so as to disengage the slides from their retained engagement with said second mentioned posts, and simultaneously bring the released slide into relative position ready to actuate the said recording or indicating disk-holding means, and a spring-actuated means for producing a downward movement of the released slide upon its post, so as to cause said slide to actuate the said disk-holding means and coöperating therewith for returning the said disk-holding means and the actuated slide to their normal initial positions, and a spring connected with each one of said series of second-mentioned posts, each spring being in engagement with a slide for rotating the actuated slide into its normal retaining engagement with the corresponding one of the series of said second-mentioned posts.

53. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, and a rock-frame adapted to be actuated by means of any one of said key-levers for causing said rock-frame to engage the released slide and producing a downward movement of the said slide upon its post, so as to cause said slide to actuate the said disk-holding means, and a spring connected with said rock-frame for returning it to its normal position, and means connected with the said disk-holding means and coöperating therewith for returning the said disk-holding means and the actuated slide to their normal initial positions, and a spring connected with each one of said series of second-mentioned posts, each spring being in engagement with a slide for rotating the actuated slide into its normal retaining engagement with the corresponding one of the series of said second-mentioned posts.

54. The combination, in an adding machine, with a series of rotatably arranged recording or indicating disks, and means normally holding said disks against movement, of a series of vertically disposed posts, a slide movably disposed upon each post, each slide being capable also of a partial rotary movement upon the post upon which it is mounted, a second series of posts, and means connected with each slide normally in engagement with said last-mentioned posts for immovably retaining said slides upon said first-mentioned posts, means adapted to be brought into engagement with said slides for producing such rotary motion of the slides so as to disengage the slides from their retained engagement with said second-mentioned posts, and simultaneously bring the released slide into relative position ready to actuate the said recording or indicating disk-holding means, a series of depressible key-levers, a rock-frame adapted to be actuated by means of any one of said key-levers, an actuating plate slidably mounted upon said rock-frame, and a series of rearwardly extending fingers connected with said plate, all arranged so that the corresponding finger will engage the released slide and produce a downward movement of the said slide upon its post, so as to cause said slide to actuate the said disk-holding means, and a spring connected with said rock-frame for returning it to its normal initial position, and means connected with the said disk-holding means and coöperating therewith for returning the said disk-holding means and the actuated slide to their normal initial positions, and a spring connected with each one of said series of second-mentioned posts, each spring being in engagement with a slide for rotating the actuated slide into its normal retaining engagement with the corresponding one of the series of said second-mentioned posts.

55. The combination, in an adding machine, with a series of rotatably arranged recording or indicating disks, of a laterally and forwardly moving setting or releasing carriage, means normally locking the said disks against movement but adapted to be brought into released relation by the movement of the said carriage, and means co-operating with said carriage for producing an intermittent return-movement of said carriage to its initial starting point.

56. The combination, in an adding machine, with a series of rotatably arranged recording or indicating disks, of a laterally and forwardly moving setting or releasing carriage, means normally locking the said disks against movement but adapted to be brought into released relation by the movement of the said carriage, and means cooperating with said carriage for producing an intermittent return-movement of said carriage to its initial starting point, consisting of a laterally-extending band provided with a series of recessed portions, and a gravity-dog pivotally connected with said carriage adapted at pre-determined times to drop into said depressions into engagement with said band and also pass out of said depressions out of engagement with said band.

57. The combination, in an adding machine, with a series of rotatably arranged recording or indicating disks, of a laterally and forwardly moving setting or releasing carriage, means normally locking the said disks against movement but adapted to be brought into released relation by the movement of the said carriage, and means coöperating with said carriage for producing an intermittent return-movement of said carriage to its initial starting point, consisting of a laterally extending and pivotally mounted band provided with a series of recessed portions, a gravity-dog pivotally connected with said carriage adapted at pre-determined times to drop into said depressions into engagement with said band, and means for lifting said band adapted to move said gravity-dog out of its engagement with said band.

58. The combination, in an adding machine, with a series of rotatably arranged recording or indicating disks, of a laterally and forwardly moving setting or releasing carriage, means normally locking the said disks against movement but adapted to be brought into released relation by the movement of the said carriage, and means coöperating with said carriage for producing an intermittent return-movement of said carriage to its initial starting point, consisting of a laterally extending and pivotally mounted band provided with a series of recessed portions, a gravity-dog pivotally connected with said carriage adapted at pre-determined times to drop into said depressions into engagement with said band, and means for lifting said band adapted to move said gravity dog out of its engagement with said band, comprising a pair of posts, arms pivotally connected with said posts and the respective end-portions of said band, and a lever provided with a fingerpiece, said lever being pivotally connected with one of said posts and having a portion thereof in operative engagement with said band.

59. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, an actuating means mounted upon said lever, normally out of engagement with the fingers of said disk-like member, but adapted to be brought into engagement with said radially extending fingers of the disk-like member, and means mounted upon said pivotally supported and spring-controlled arm adapted to be brought into engagement with said actuating means as soon as said arm moves in a downward direction for causing said actuating means to be brought into its operative engagement with the fingers of said disk-like member.

60. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, an actuating means mounted upon said lever, normally out of engagement with the fingers of said disk-like member, but adapted to be brought into engagement with said radially extending fingers of the disk-like member, means mounted upon said pivotally supported and spring-controlled arm adapted to be brought into engagement with said actuating means as soon as said arm moves in a downward direction for causing said actuating means to be brought into its operative engagement with the fingers of said disk-like member, and means in engagement and coöperating with said oscillatory lever for forcing at a pre-determined time the said actuating means again out of its engagement with the fingers of said disk-like member.

61. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, an actuating means mounted upon said lever, normally out of engagement with the fingers of said disk-like member, but adapted to be brought into engagement with said radially extending fingers of the disk-like member, means mounted upon said pivotally supported and spring-controlled arm adapted to be brought into engagement with said actuating means as soon as said arm moves in a downward direction for causing said actuating means to be brought into its operative engagement with the fingers of said disk-like member, and means in engagement and coöperating with said oscillatory lever for forcing at a predetermined time the said actuating means again out of its engagement with the fingers of said disk-like member, consisting of an oscillatory rod, an arm mounted upon said rod, the free end-portion of said arm being angularly bent and being adapted to engage with a portion of said oscillatory lever, a finger extending from said oscillatory rod, and a rock-frame adapted to engage said finger for actuating said oscillatory rod.

62. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, an actuating means mounted upon said lever, normally out of arrangement with the fingers of said disk-like member, but adapted to be brought into engagement with said radially extending fingers of the disk-like member, means mounted upon said pivotally supported and spring-controlled arm adapted to be brought into engagement with said actuating means as soon as said arm moves in a downward direction for causing said actuating means to be brought into its operative engagement with the fingers of said disk-like member, and an oscillatory stop-arm adapted to be moved into holding engagement with the fingers of said disk-like member to arrest the momentum of said disk-like member and the said indicating or recording disk.

63. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, an actuating means mounted upon said lever, normally out of engagement with the fingers of said disk-like member, but adapted to be brought into engagement with said radially extending fingers of the disk-like member, means mounted upon said pivotally supported and spring-controlled arm adapted to be brought into engagement with said actuating means as soon as said arm moves in a downward direction for causing said actuating means to be brought into its operative engagement with the fingers of said disk-like member, and means in engagement and coöperating with said oscillatory lever for forcing at a pre-determined time the said actuating means again out of its engagement with the fingers of said disk-like member, and an oscillatory stop-arm adapted to be moved into holding engagement with the fingers of said disk-like member to arrest the momentum of said disk-like member and the said indicating or recording disk.

64. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, an actuating means mounted upon said lever, normally out of engagement with the fingers of said disk-like member, but adapted to be brought into engagement with said radially extending fingers of the disk-like member, means mounted upon said pivotally supported and spring-controlled arm adapted to be brought into engagement with said actuating means as soon as said arm moves in a downward direction for causing said actuating means to be brought into its operative engagement with the fingers of said disk-like member, and means in engagement and coöperating with said oscillatory lever for forcing at a pre-determined time the said actuating means again out of its engagement with the fingers of said disk-like member, consisting of an oscillatory rod, an arm mounted upon said rod, the free end-portion of said arm being angularly bent and being adapted to engage with a portion of said oscillatory lever, a finger extending from said oscillatory rod, and a rock-frame adapted to engage said finger for actuating said oscillatory rod, and a stop-arm mounted upon said oscillatory rod, said stop-arm being adapted to be moved into holding engagement with the fingers of said disk-like member to arrest the momentum of said disk-like member and the said indicating or recording disk.

65. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, a pull-piece connected with and carried by said oscillatory lever, said pull-piece having a holding portion adapted to be brought into engagement with said radially extending fingers of the said disk-like member, a spring-controlled dog pivotally connected with said oscillatory lever for normally holding said holding portion of the said pull-piece out of engagement with the fingers of said disk-like member, the said dog being provided also with a lateral extending projection, and an upwardly extending arm-like member rigidly connected with said pivotally supported and spring-controlled arm, said arm-like member being provided with a bent portion adapted to be brought into slidable engagement with the projection of said dog for causing the holding portion of said pull-piece to be brought into its operative engagement with the fingers of said disk-like member.

66. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, a pull-piece connected with and carried by said oscillatory lever, said pull-piece having a holding portion adapted to be brought into engagement with said radially extending fingers of the said disk-like member, a spring-controlled dog pivotally connected with said oscillatory lever for normally holding said holding portion of the said pull-piece out of engagement with the fingers of said disk-like member, the said dog being provided also with a lateral extending projection, and an upwardly extending arm-like member rigidly connected with said pivotally supported and spring-controlled arm, said arm-like member being provided with a bent portion adapted to be brought into slidable engagement with the projection of said dog for causing the holding portion of said pull-piece to be brought into its operative engagement with the fingers of said disk-like member, and means in engagement and coöperating with said oscillatory lever for forcing at a predetermined time the said holding portion of the pull-piece out of its engagement with the fingers of said disk-like member.

67. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, a pull-piece connected with and carried by said oscillatory lever, said pull-piece having a holding portion adapted to be brought into engagement with said radially extending fingers of the said disk-like member, a spring-controlled dog pivotally connected with said oscillatory lever for normally holding said holding portion of the said pull-piece out of engagement with the fingers of said disk-like member, the said dog being provided also with a lateral extending projection, and an upwardly extending arm-like member rigidly connected with said pivotally supported and spring-controlled arm, said arm-like member being provided with a bent portion adapted to be brought into slidable engagement with the projection of said dog for causing the holding portion of said pull-piece to be brought into its operative engagement with the fingers of said disk-like member, and means in engagement and coöperating with said oscillatory lever for forcing at a pre-determined time the said holding portion of the pull-piece out of its engagement with the fingers of said disk-like member, consisting of an oscillatory rod, an arm mounted upon said rod, the free end-portion of said arm being angularly bent and being adapted to engage with a portion of said oscillatory lever, a finger extending from said oscillatory rod, and a rock-frame adapted to engage said finger for actuating said oscillatory rod.

68. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, a pull-piece connected with and carried by said oscillatory lever, said pull-piece having a holding portion adapted to be brought into engagement with said radially extending fingers of the said disk-like member, a spring-controlled dog pivotally connected with said oscillatory lever for normally holding said holding portion of the said pull-piece out of engagement with the fingers of said disk-like member, the said dog being provided also with a laterally extending projection, and an upwardly extending arm-like member rigidly connected with said pivotally supported and spring-controlled arm; said arm-like member being provided with a bent-like portion adapted to be brought into slidable engagement with the projection of said dog for causing the holding portion of said pull-piece to be brought into its operative engagement with the fingers of said disk-like member, and an oscillatory stop-arm adapted to be moved into holding engagement with the fingers of said disk-like member to arrest the momentum of said disk-like member and the said indicating or recording disk.

69. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, a pull-piece connected with and carried by said oscillatory lever, said pull-piece having a holding portion adapted to be brought into engagement with said radially extending fingers of the said disk-like member, a spring-controlled dog pivotally connected with said oscillatory lever for normally holding said holding portion of the said pull-piece out of engagement with the fingers of said disk-like member, the said dog being provided also with a lateral extending projection, and an upwardly extending arm-like member rigidly connected with said pivotally supported and spring-controlled arm, said arm-like member being provided with a bent portion adapted to be brought into slidable engagement with the projection of said dog for causing the holding portion of said pull-piece to be brought into its operative engagement with the fingers of said disk-like member, and means in engagement and coöperating with said oscillatory lever for forcing at a pre-determined time the said holding portion of the pull-piece out of its engagement with the fingers of said disk-like member, and an oscillatory stop-arm adapted to be moved into holding engagement with the fingers of said disk-like member to arrest the momentum of said disk-like member and the said indicating or recording disk.

70. In an adding machine, a recording or indicating disk loosely and rotatably mounted upon a rod, said disk being provided with a hub, a disk-like member permanently affixed upon said hub, said disk-like member being provided upon its circumferential edge-portion with radially extending fingers, an oscillatory lever loosely mounted upon said rod, a pivotally supported and spring-controlled arm, means adapted to be brought into engagement with a portion of said arm for forcing said arm in a downward direction, a connecting link between said arm and said lever, a pull-piece connected with and carried by said oscillatory lever, said pull-piece having a holding portion adapted to be brought into engagement with said radially extending fingers of the said disk-like member, a spring-controlled dog pivotally connected with said oscillatory lever for normally holding said holding portion of the said pull-piece out of engagement with the fingers of said disk-like member, the said dog being provided also with a lateral extending projection, and an upwardly extending arm-like member rigidly connected with said pivotally supported and spring-controlled arm, said arm-like member being provided with a bent portion adapted to be brought into slidable engagement with the projection of said dog for causing the holding portion of said pull-piece to be brought into its operative engagement with the fingers of said disk-like member, and means in engagement and coöperating with said oscillatory lever for forcing at a pre-determined time the said holding portion of the pull-piece out of its engagement with the fingers of said disk-like member, consisting of an oscillatory rod, an arm mounted upon said rod, the free end-portion of said arm being angularly bent and being adapted to engage with a portion of said oscillatory lever, a finger extending from said oscillatory rod, and a rock-frame adapted to engage said finger for actuating said oscillatory rod, and a stop-arm mounted upon said oscillatory rod, said stop-arm being adapted to be moved into holding engagement with the fingers of said disk-like member to arrest the momentum of said disk-like member and the said indicating or recording disk.

71. In an adding machine, a recording or indicating disk loosely and rotatably mounted upon a rod, said disk being provided with a hub, a disk-like member permanently affixed upon said hub, said disk-like member being provided upon its circumferential edge-portion with ratchet-teeth, a pivotally disposed gravity-dog adapted to enter into engagement with the said ratchet-teeth, and means for actuating the said gravity-dog.

72. In an adding machine, a recording or indicating disk loosely and rotatably mounted upon a rod, said disk being provided with a hub, a disk-like member permanently affixed upon said hub, said disk-like member being provided upon its circumferential edge-portion with ratchet-teeth, a pivotally disposed gravity-dog adapted to enter into engagement with the said ratchet-teeth, and means for actuating the said gravity dog, consisting of an oscillatorily arranged bearing-like member, a rocker-arm extending from said member, said gravity-dog being mounted upon said rocker-arm, a stop-arm extending from said rocker-arm, said stop-arm being provided with a stud-like extension, combined with a trip-device comprising a bearing-like member, a stop-arm upon said last-mentioned bearing-like member, and a stud-like extension on said last-mentioned stop-arm, an arm extending from said last-mentioned bearing-like member, said arm being provided at its free end-portion with an engaging member, and a trip-arm extending from the hub of said recording or indicating disk, said trip-arm being adapted to be brought into lifting engagement with said engaging member.

73. In an adding machine, a recording or indicating disk loosely and rotatably mounted upon a rod, said disk being provided with a hub, a disk-like member permanently affixed upon said hub, said disk-like member being provided upon its circumferential edge-portion with ratchet-teeth, an oscillatorily disposed rocker-arm, a gravity-dog pivotally disposed upon said rocker-arm and adapted to enter into engagement with the said ratchet-disk, and means for actuating said rocker-arm.

74. In an adding machine, a recording or indicating disk loosely and rotatably mounted upon a rod, said disk being provided with a hub, a disk-like member permanently affixed upon said hub, said disk-like member being provided upon its circumferential edge-portion with ratchet-teeth, an oscillatorily disposed rocker-arm, a gravity-dog pivotally disposed upon said rocker-arm and adapted to enter into engagement with the said ratchet-disk, and means for actuating said rocker-arm, consisting of a vertically moving bar adapted to be brought into lifting engagement with said rocker-arm, a pivotally disposed frame having portions in slidable engagement with said bar, a link pivotally connected with said frame, an oscillatory spindle, and a disk upon said spindle, said disk having a cut-away part forming a pull-portion for exerting a pull on said link and producing a lifting action of said pivotally disposed frame.

In testimony, that I claim the invention set forth above I have hereunto set my hand this fourteenth day of February, 1912.

LEVI I. DARBY.

Witnesses:
FREDK. C. FRAENTZEL,
FREDK. H. W. FRAENTZEL.